United States Patent [19]
Perez

[11] Patent Number: 5,356,692
[45] Date of Patent: Oct. 18, 1994

[54] GRID STRUCTURE WITH SINUOUS INTERSTICES

[75] Inventor: John M. Perez, Sunnyvale, Calif.

[73] Assignee: Lockheed Missiles & Space Company, Inc., Sunnyvale, Calif.

[21] Appl. No.: 922,613

[22] Filed: Jul. 27, 1992

[51] Int. Cl.$^5$ .............. B32B 3/12; D03D 41/00; B05D 5/00
[52] U.S. Cl. .................... 428/116; 427/173; 427/174; 139/11; 118/33
[58] Field of Search ............ 428/116, 83, 53, 113; 118/33; 139/11, 380, 429; 427/171, 172, 177, 178

[56] References Cited

U.S. PATENT DOCUMENTS

| | | | |
|---|---|---|---|
| 3,916,054 | 10/1975 | Long et al. | 428/116 |
| 4,211,601 | 7/1980 | Mogab | 156/643 |
| 4,836,887 | 6/1989 | Daubenspeck et al. | 156/643 |
| 4,988,469 | 1/1991 | Reavely et al. | 428/912.2 X |
| 5,080,963 | 1/1992 | Tatarchuk et al. | 428/288 |
| 5,175,198 | 12/1992 | Minnich et al. | 428/34.5 |

*Primary Examiner*—Peter A. Nelson
*Attorney, Agent, or Firm*—John J. Morrissey

[57] ABSTRACT

A grid structure with sinuous interstices comprises intersecting grid sections having undulate surfaces. The intersecting grid sections of the grid structure are made of a composite material consisting of fibers (e.g., graphite fibers) embedded in a matrix (e.g., epoxy resin).

49 Claims, 22 Drawing Sheets

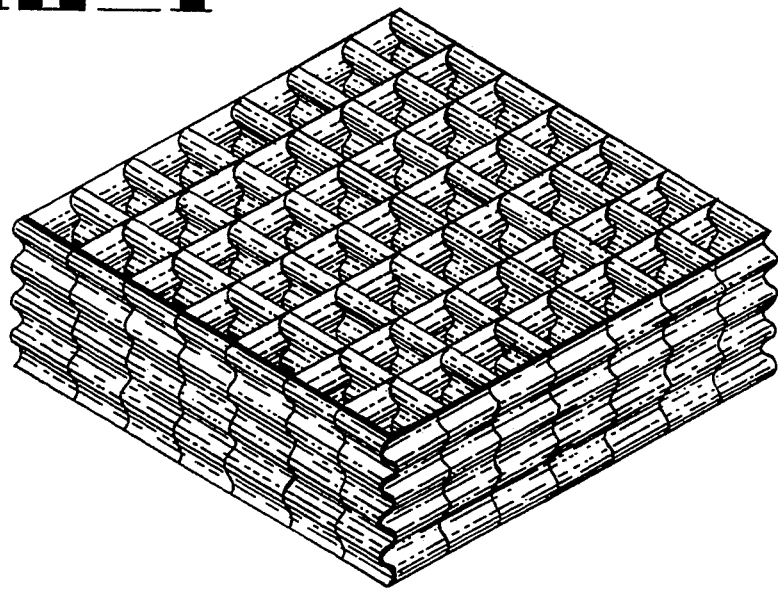
FIG_1
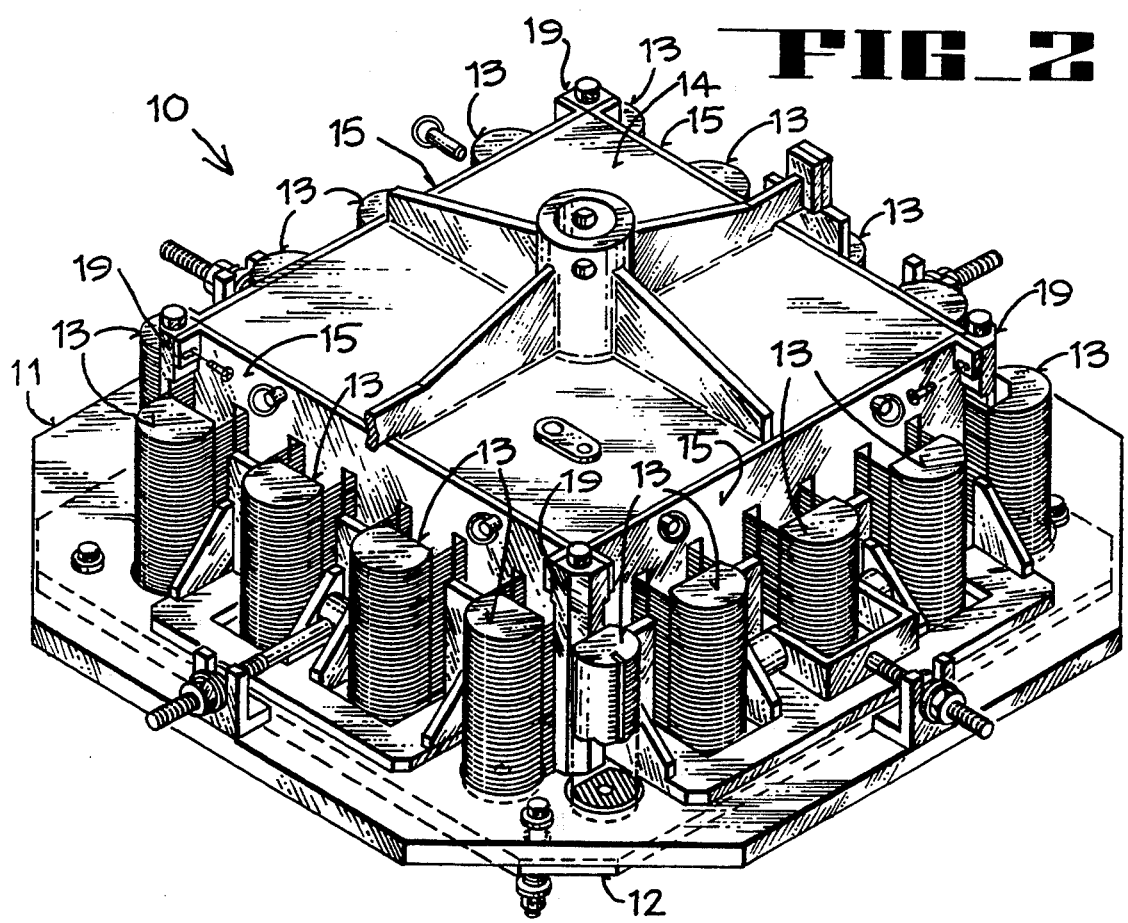
FIG_2

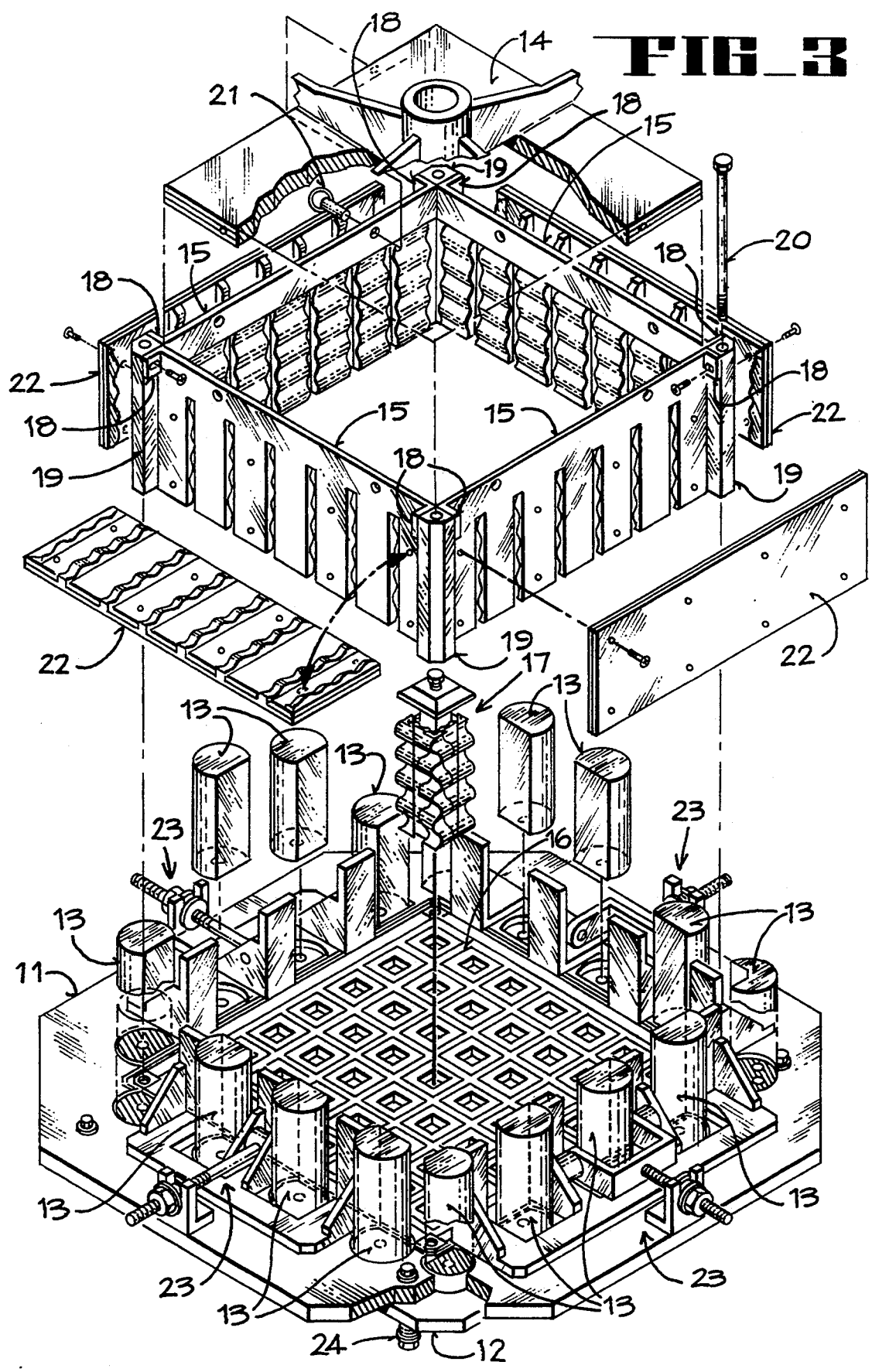

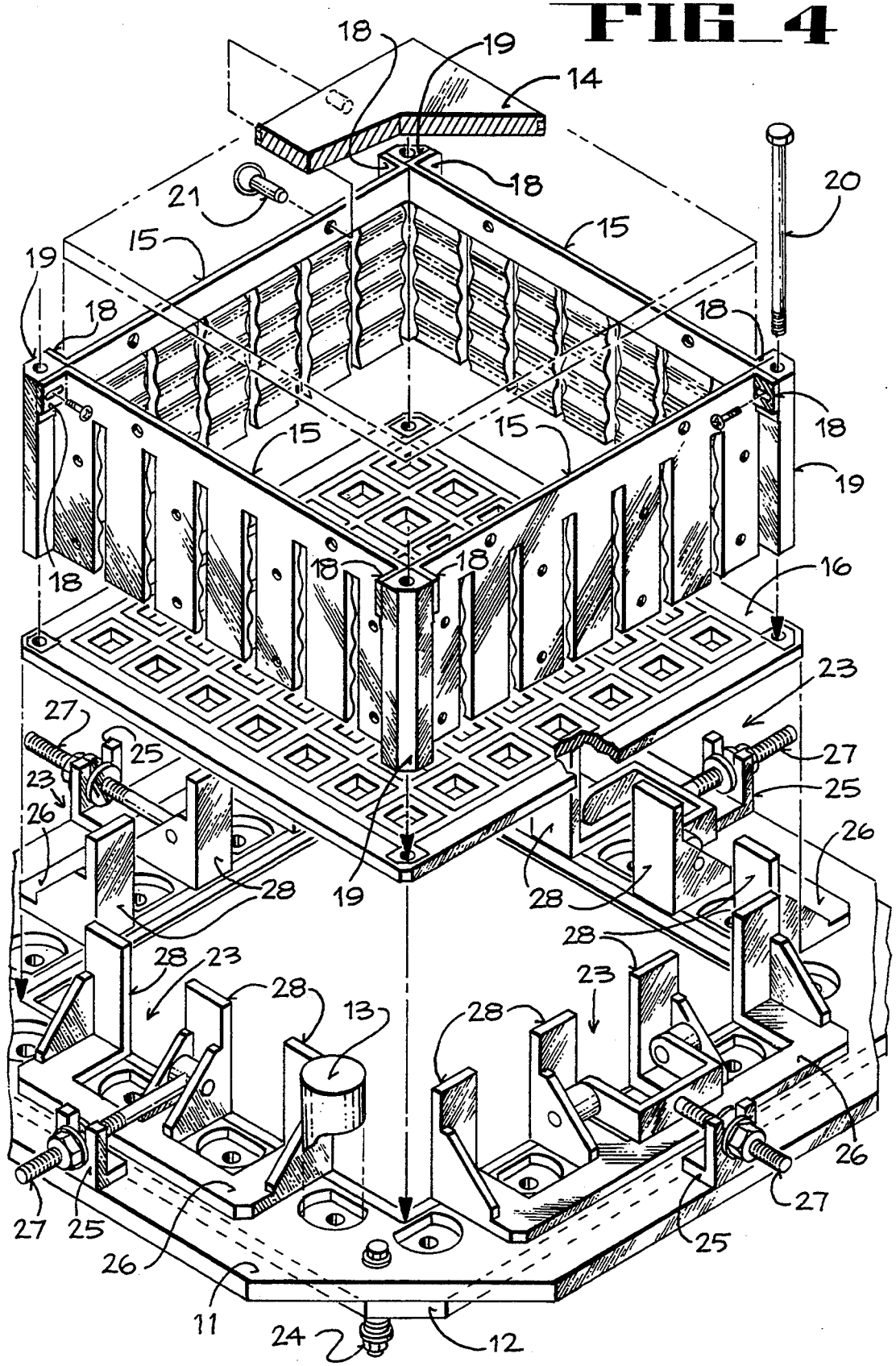

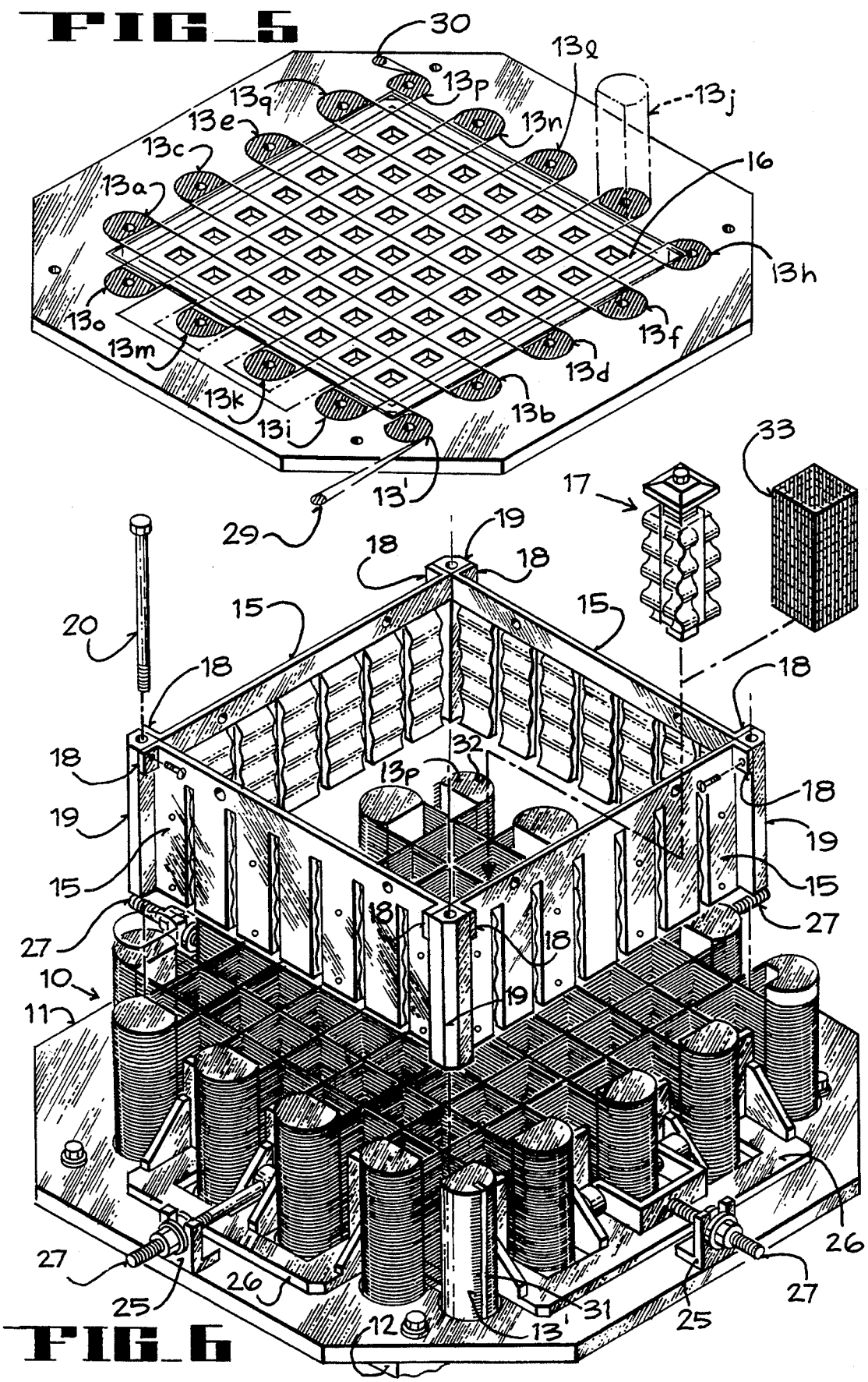

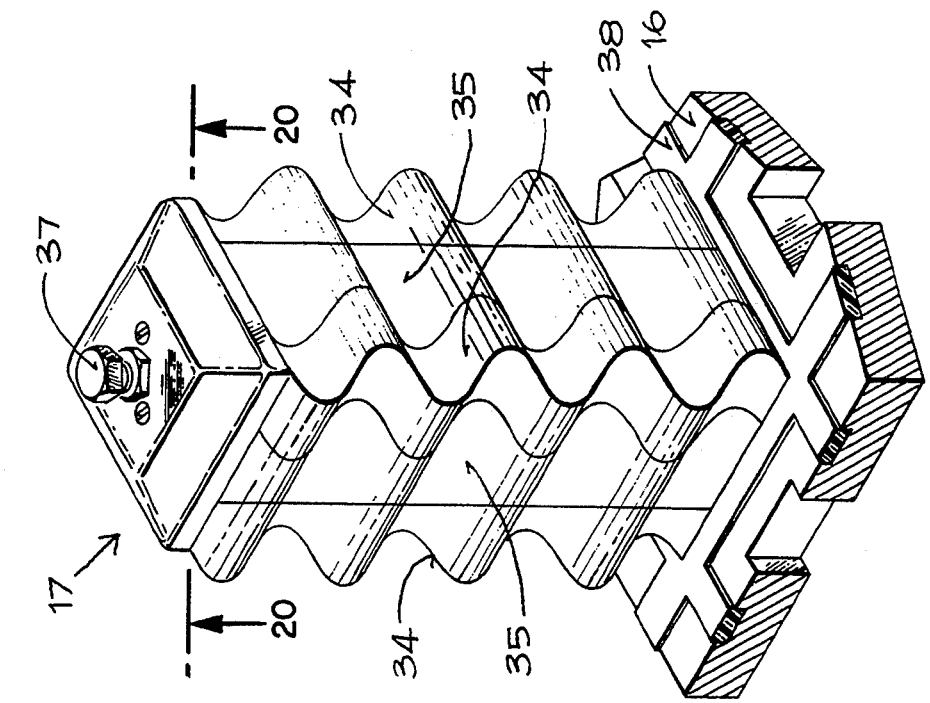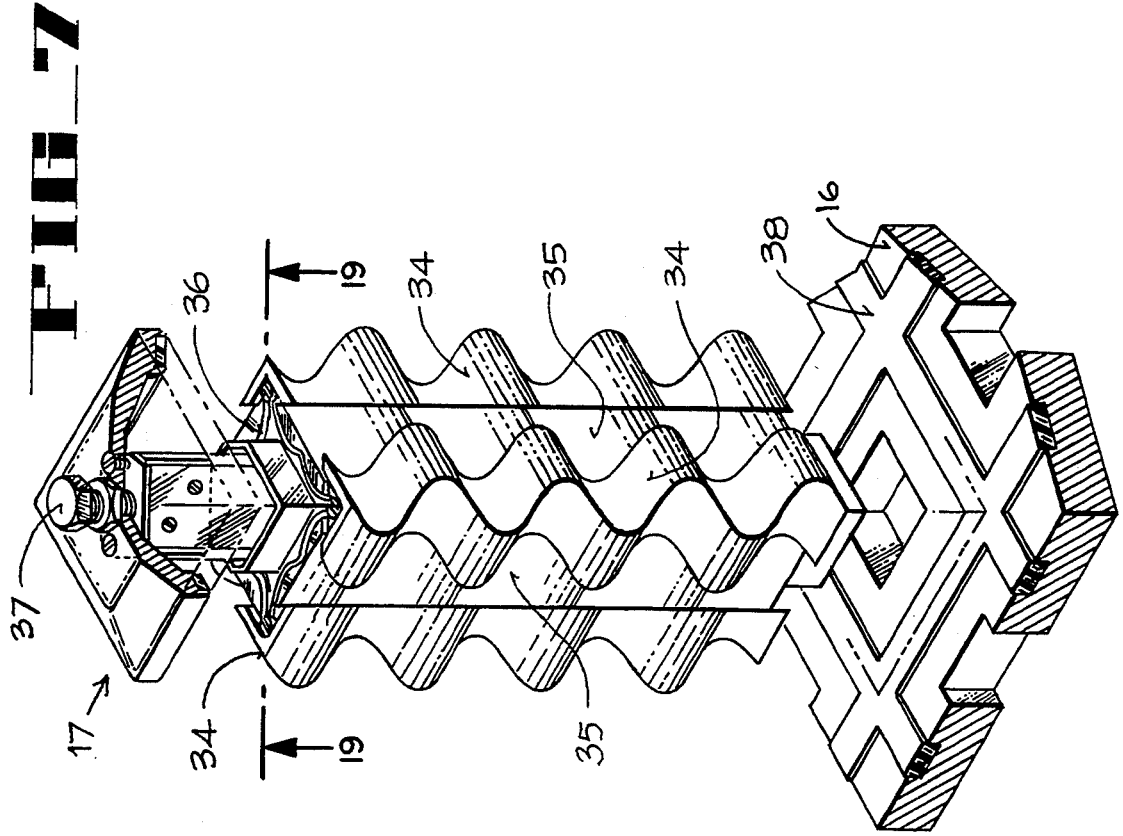

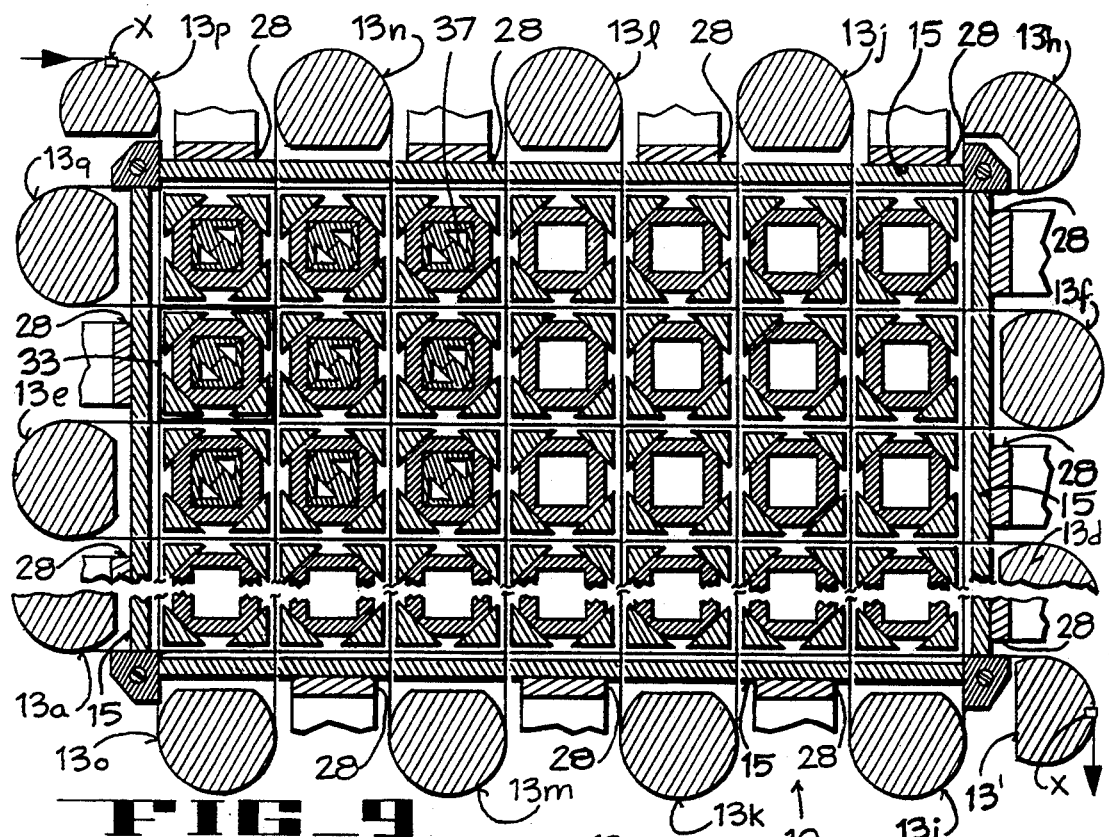
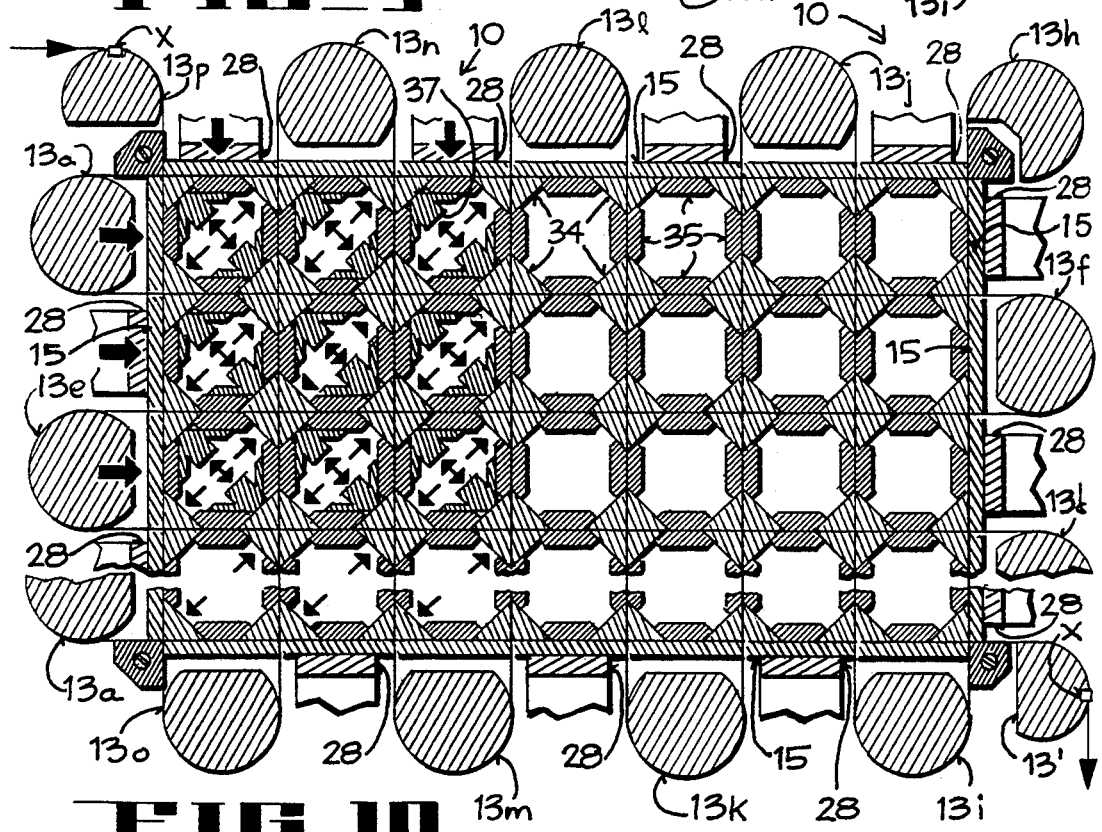

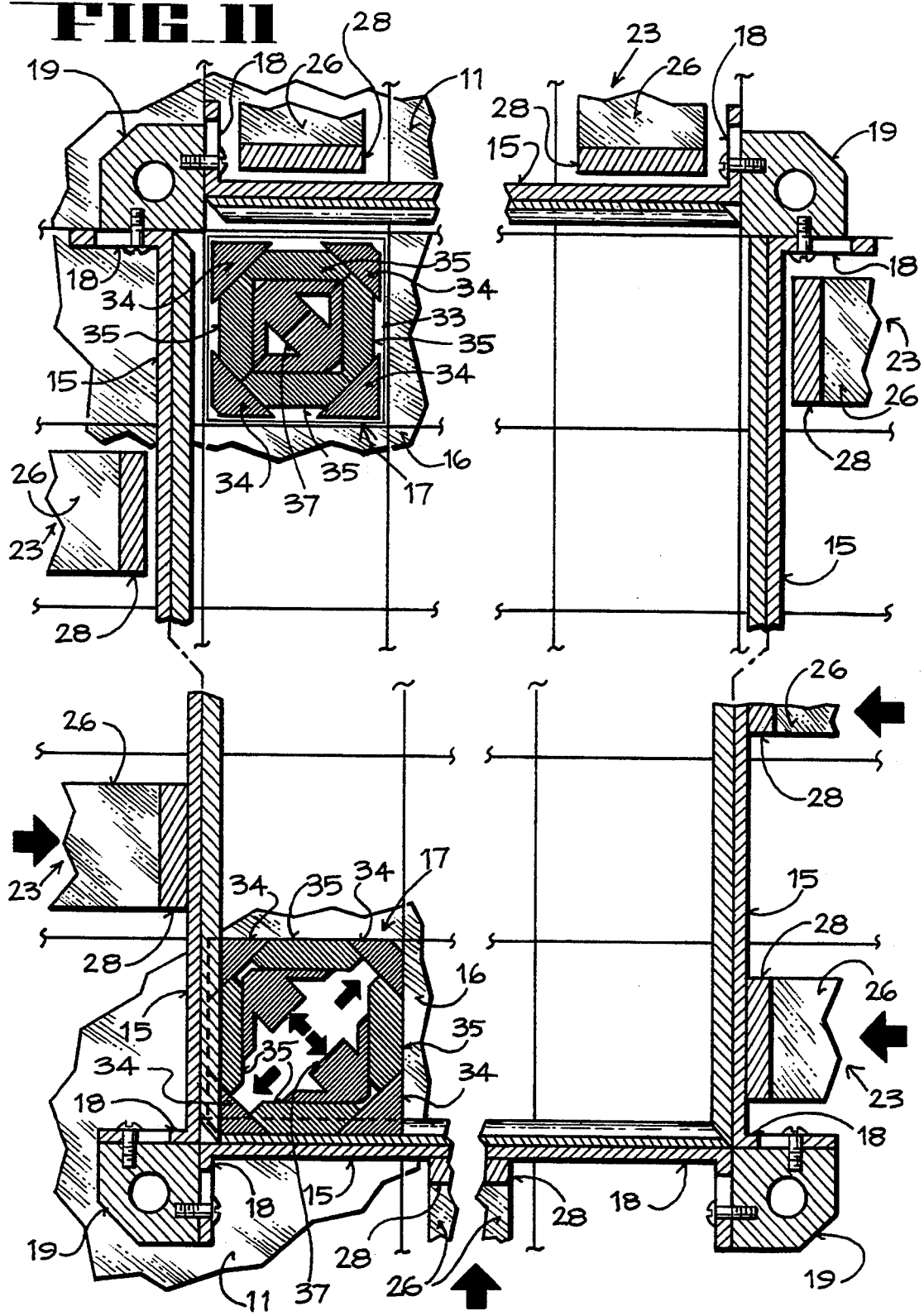

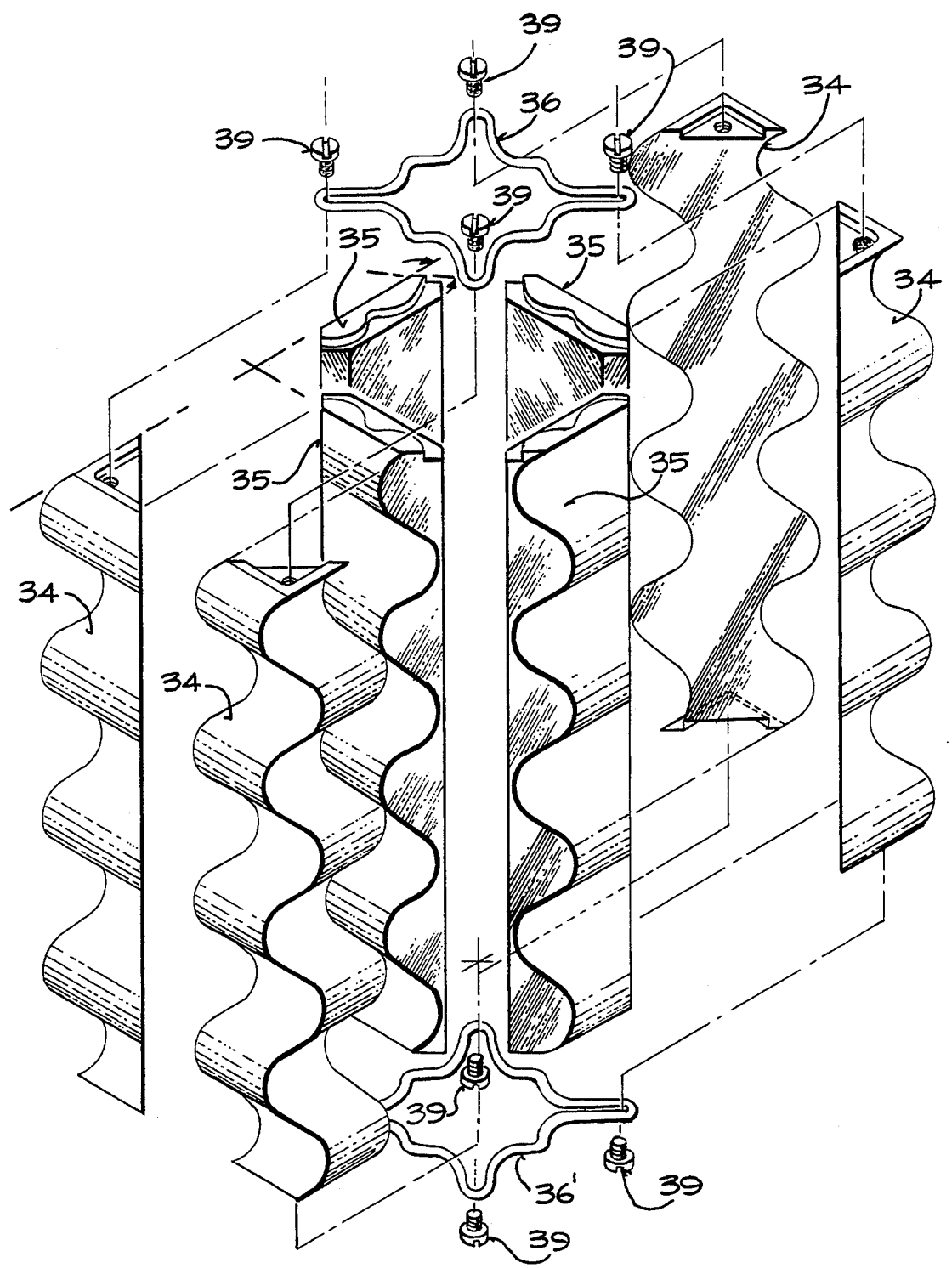
FIG_12

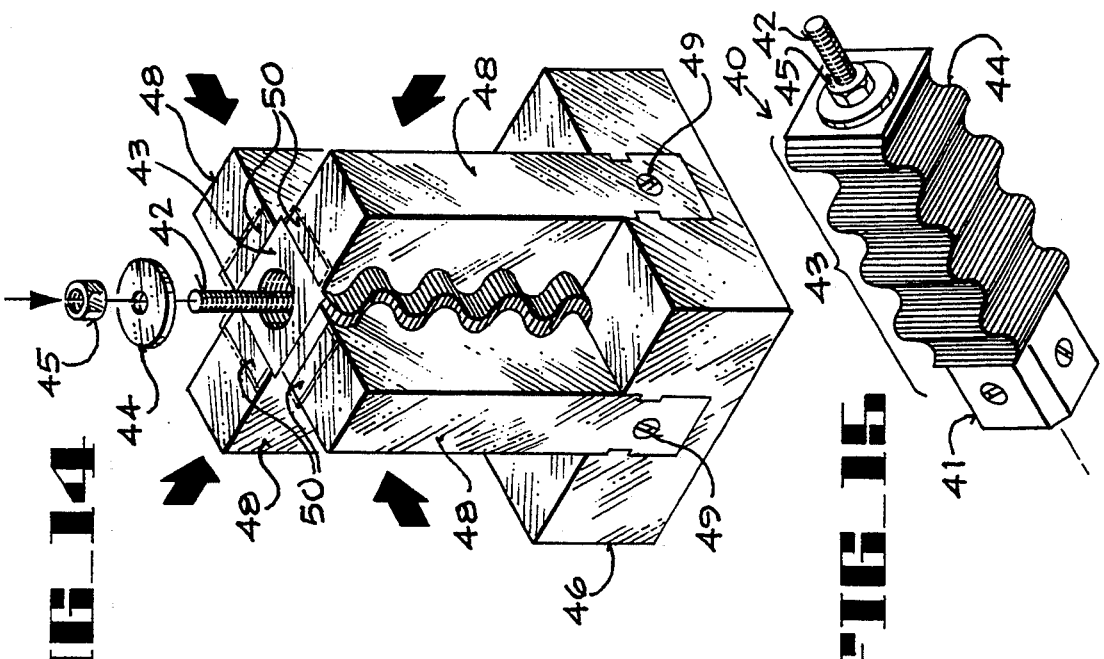
FIG_14  FIG_15
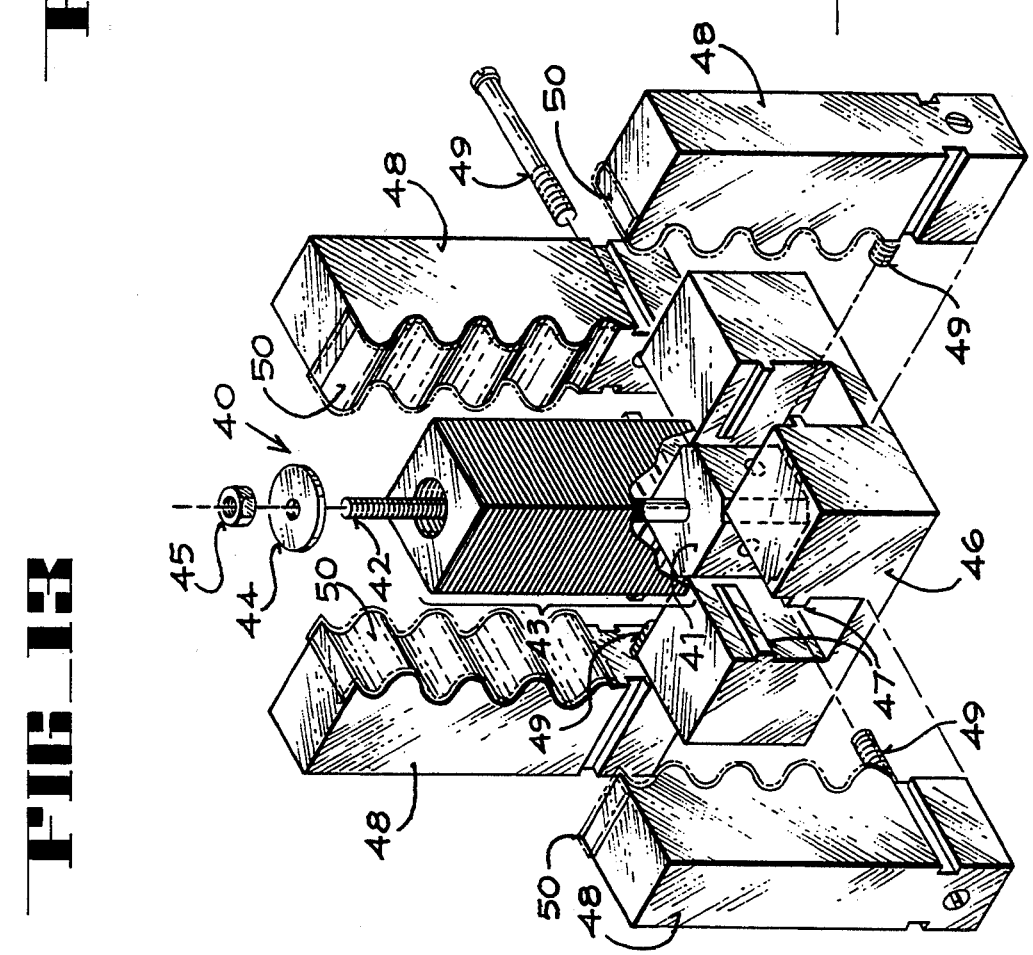
FIG_13

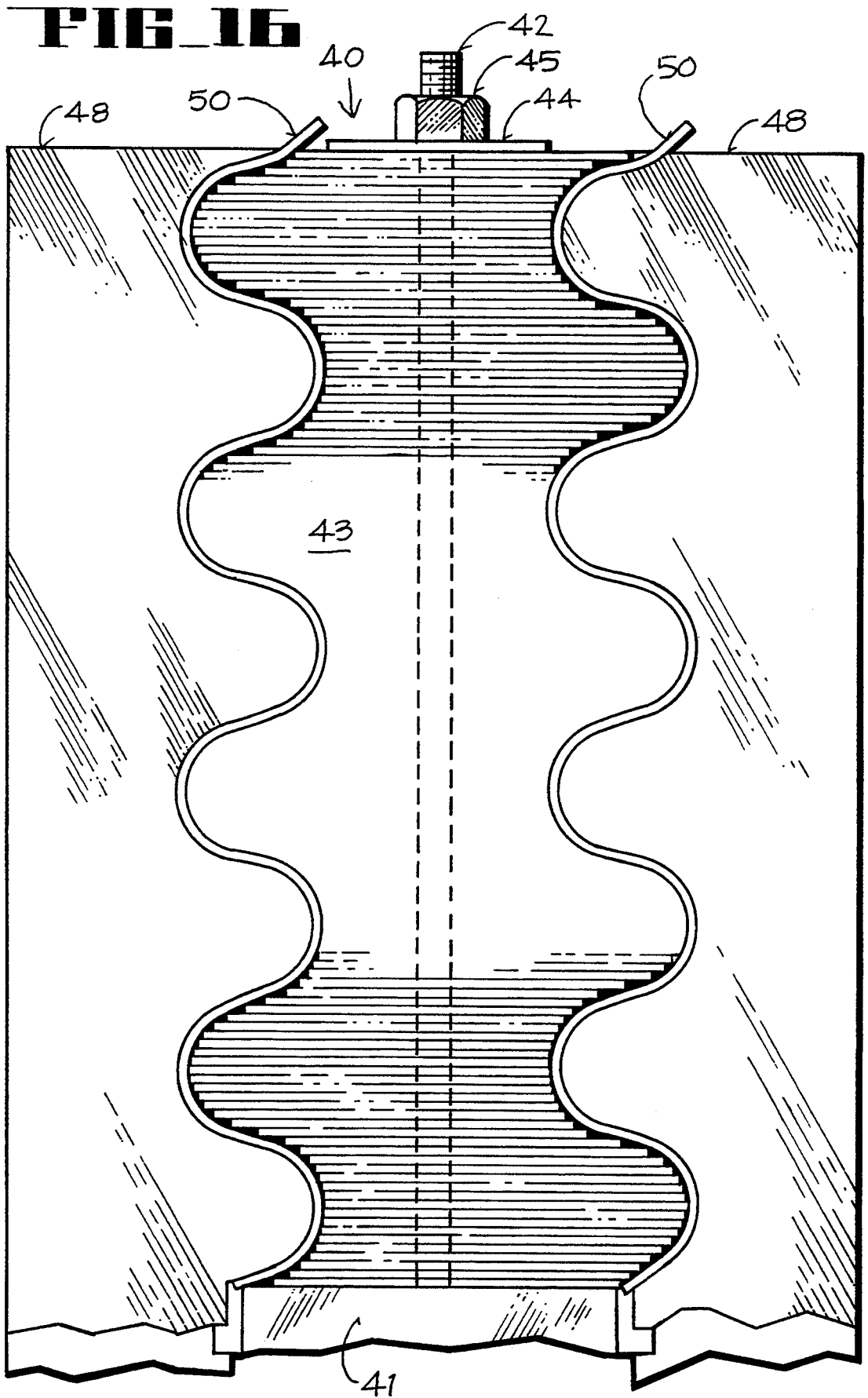

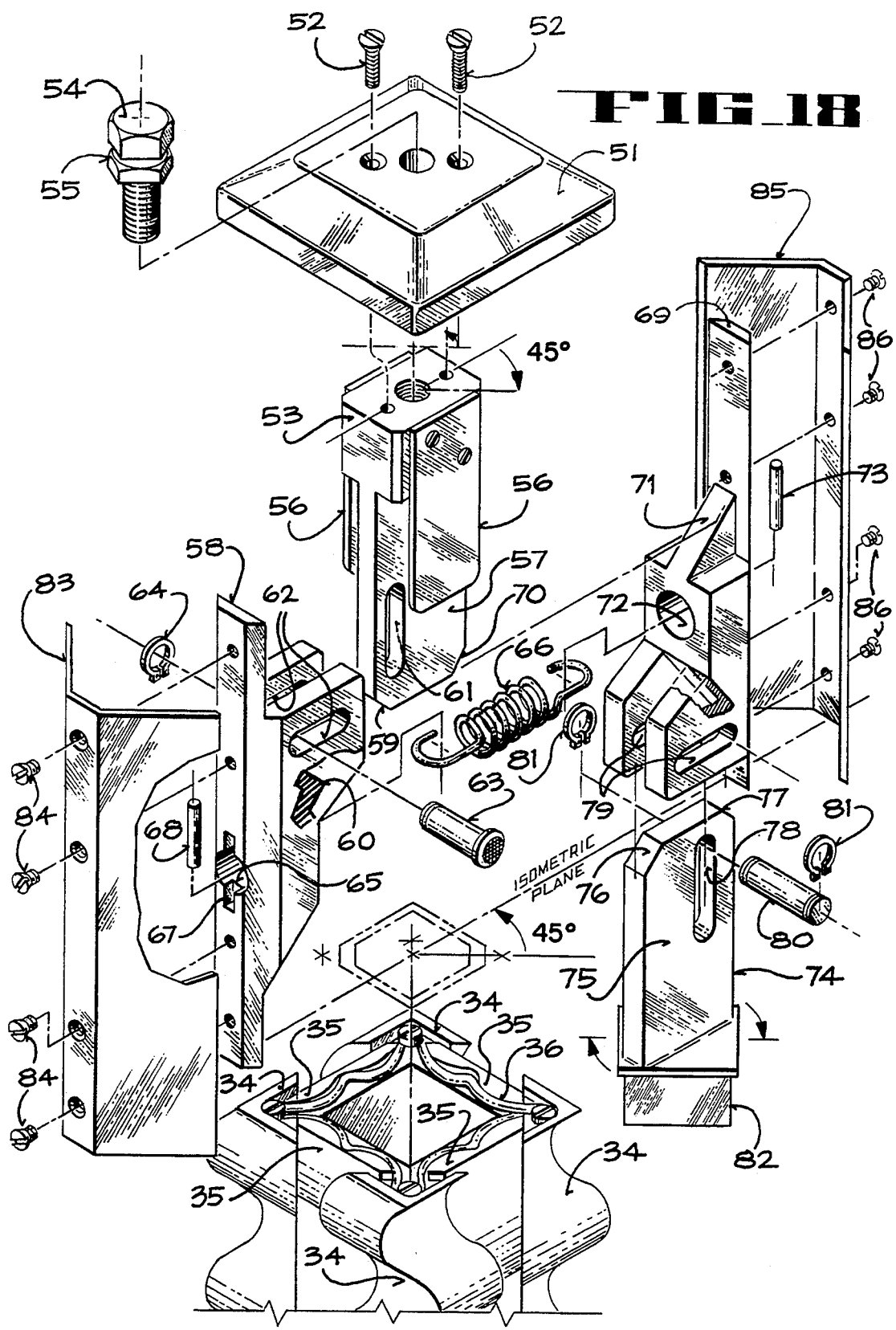

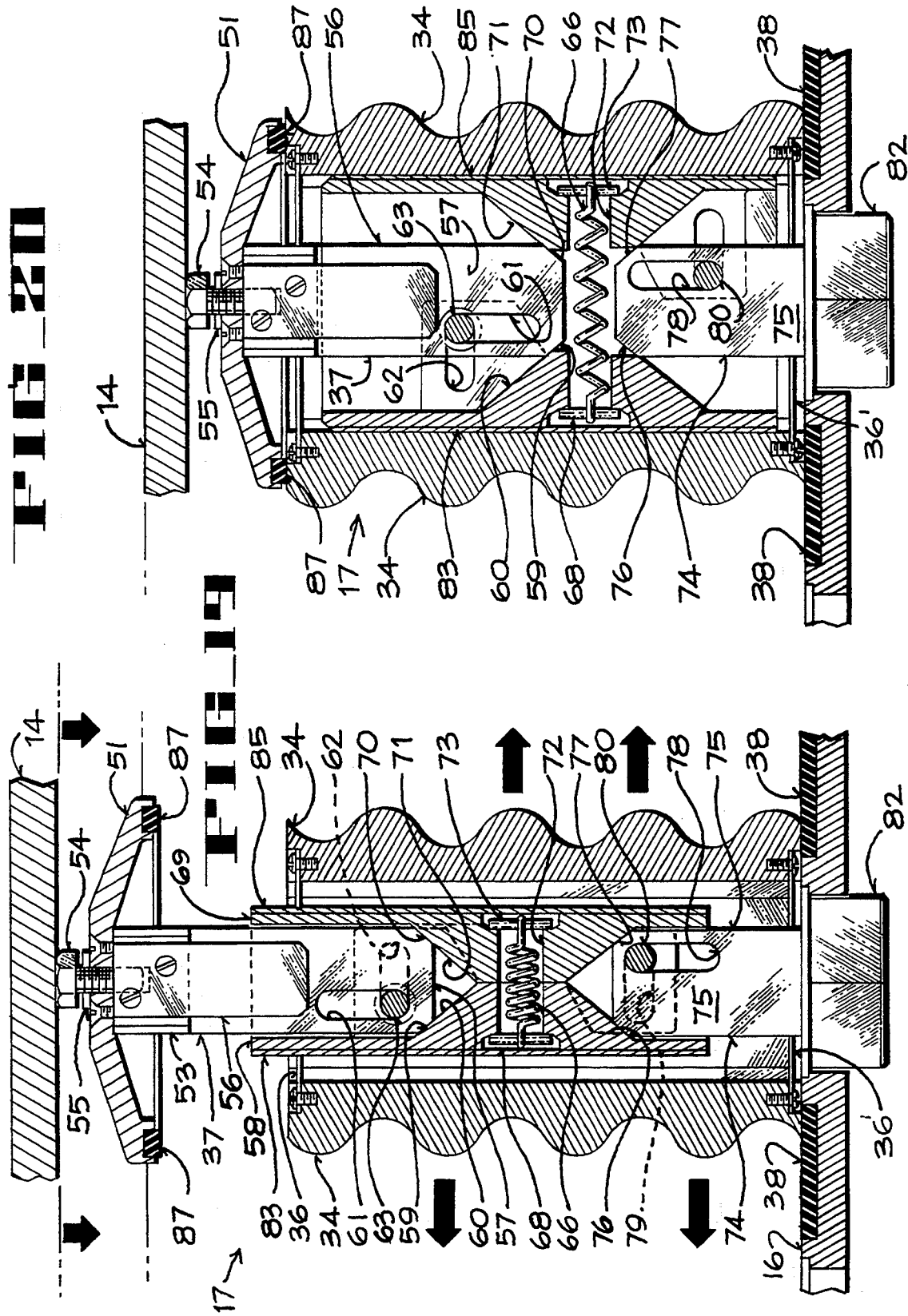

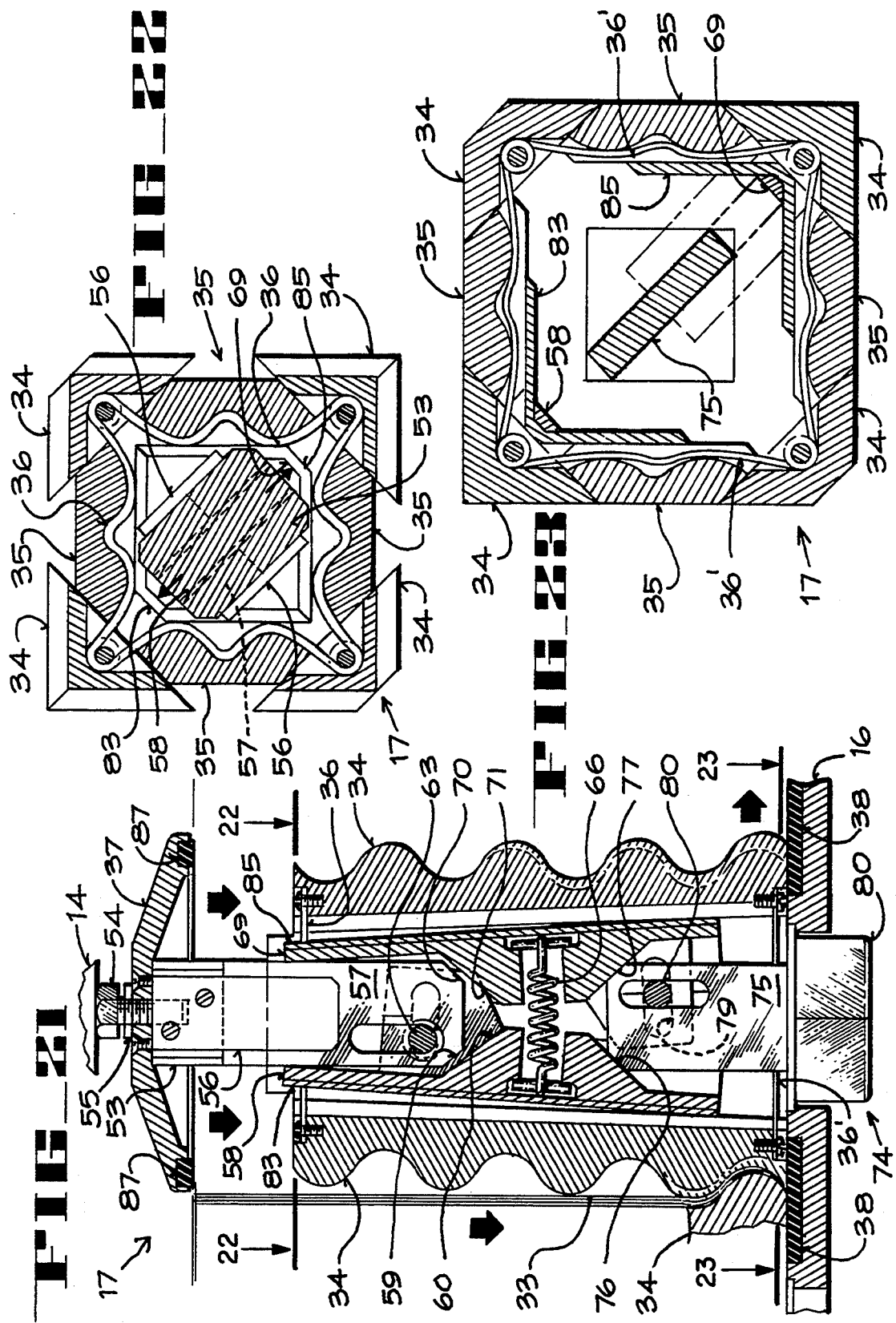

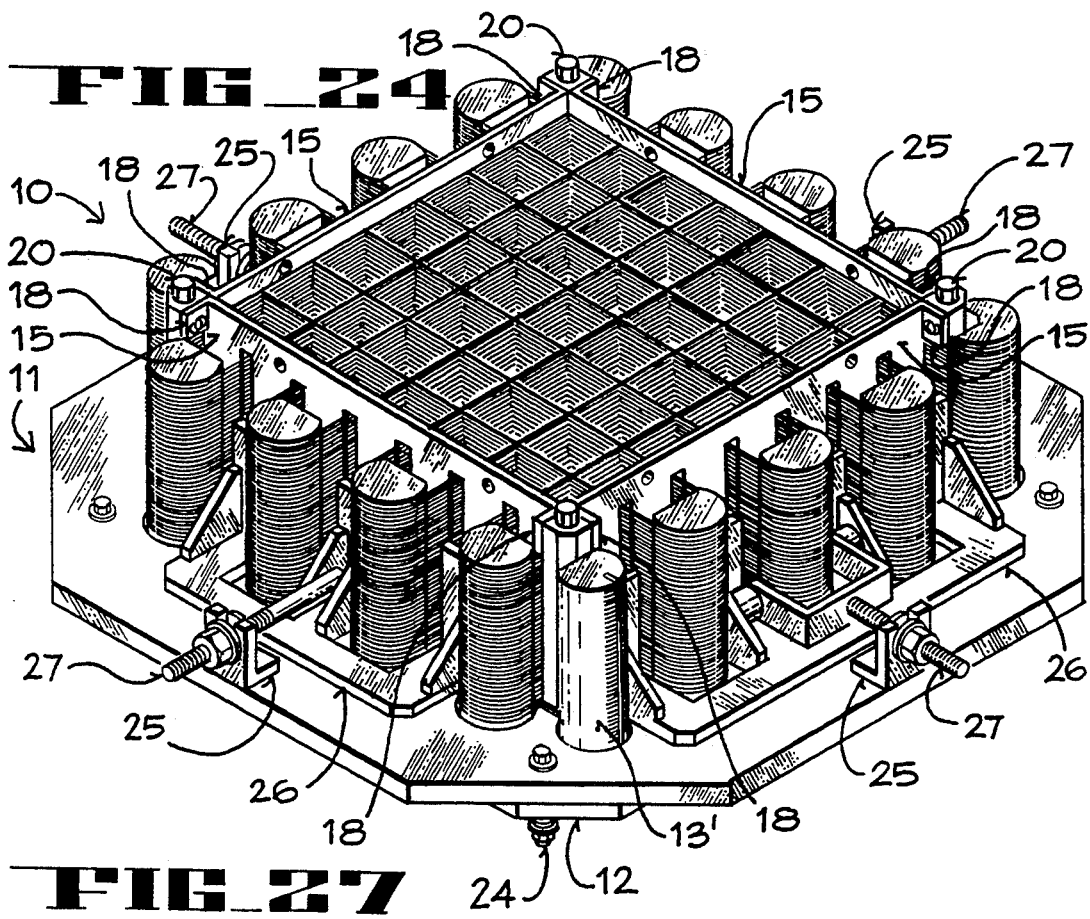

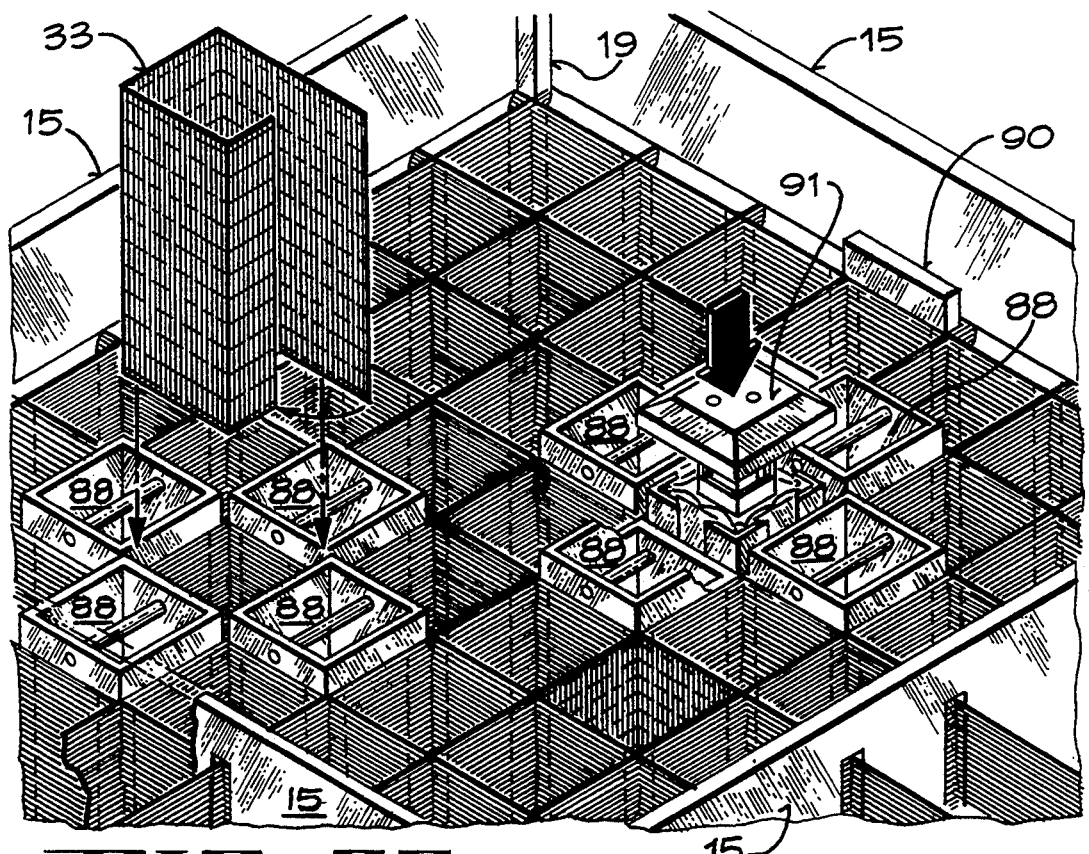
FIG_30
FIG_31
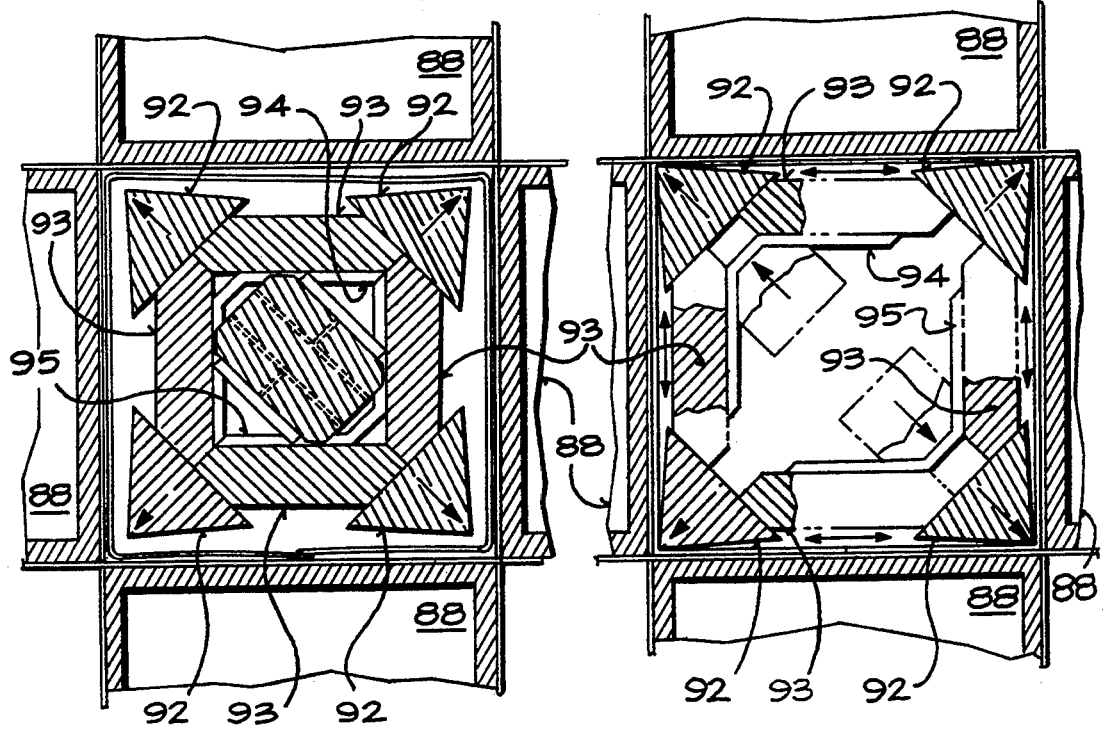
FIG_32

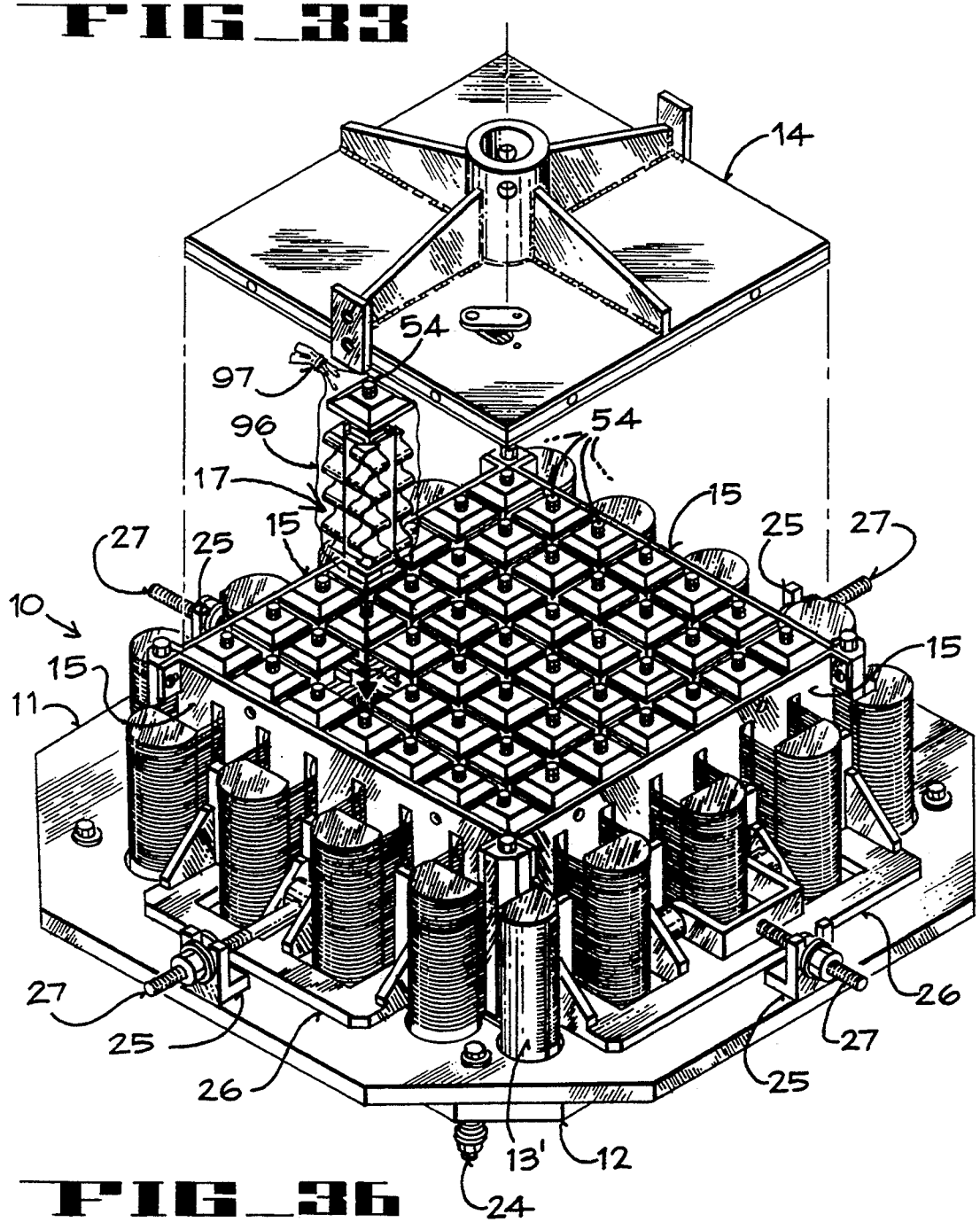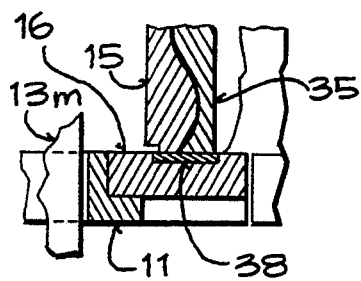

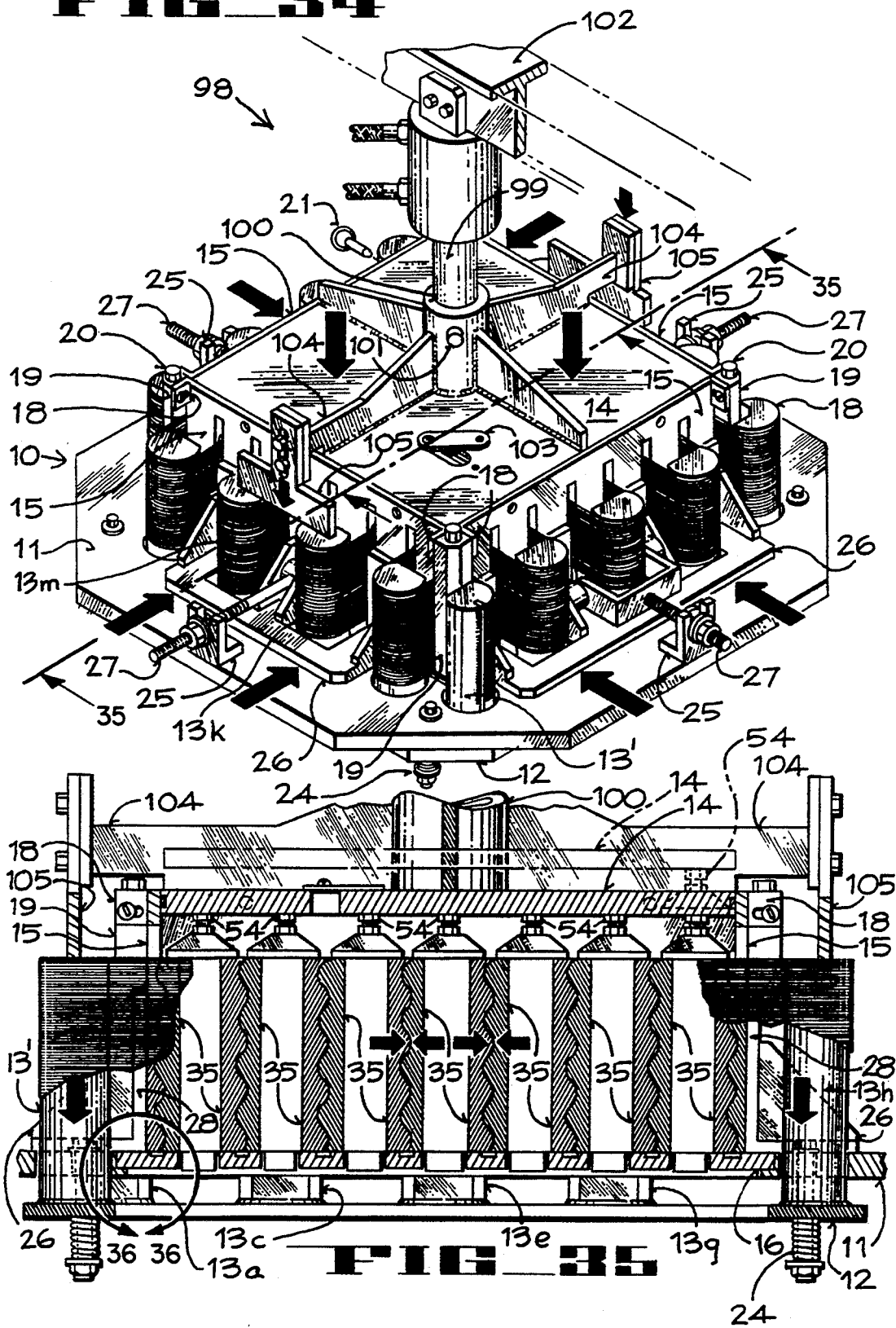

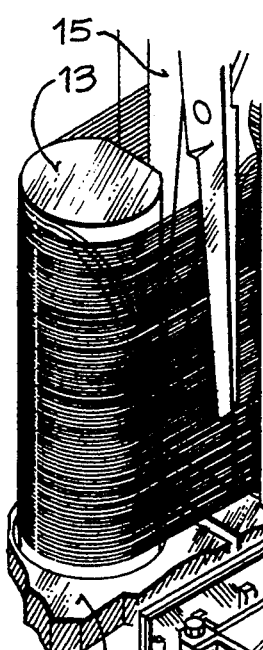
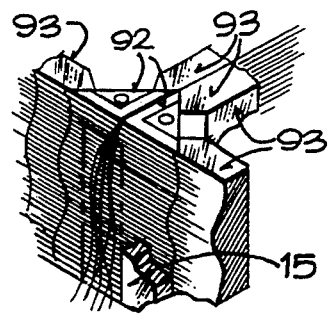
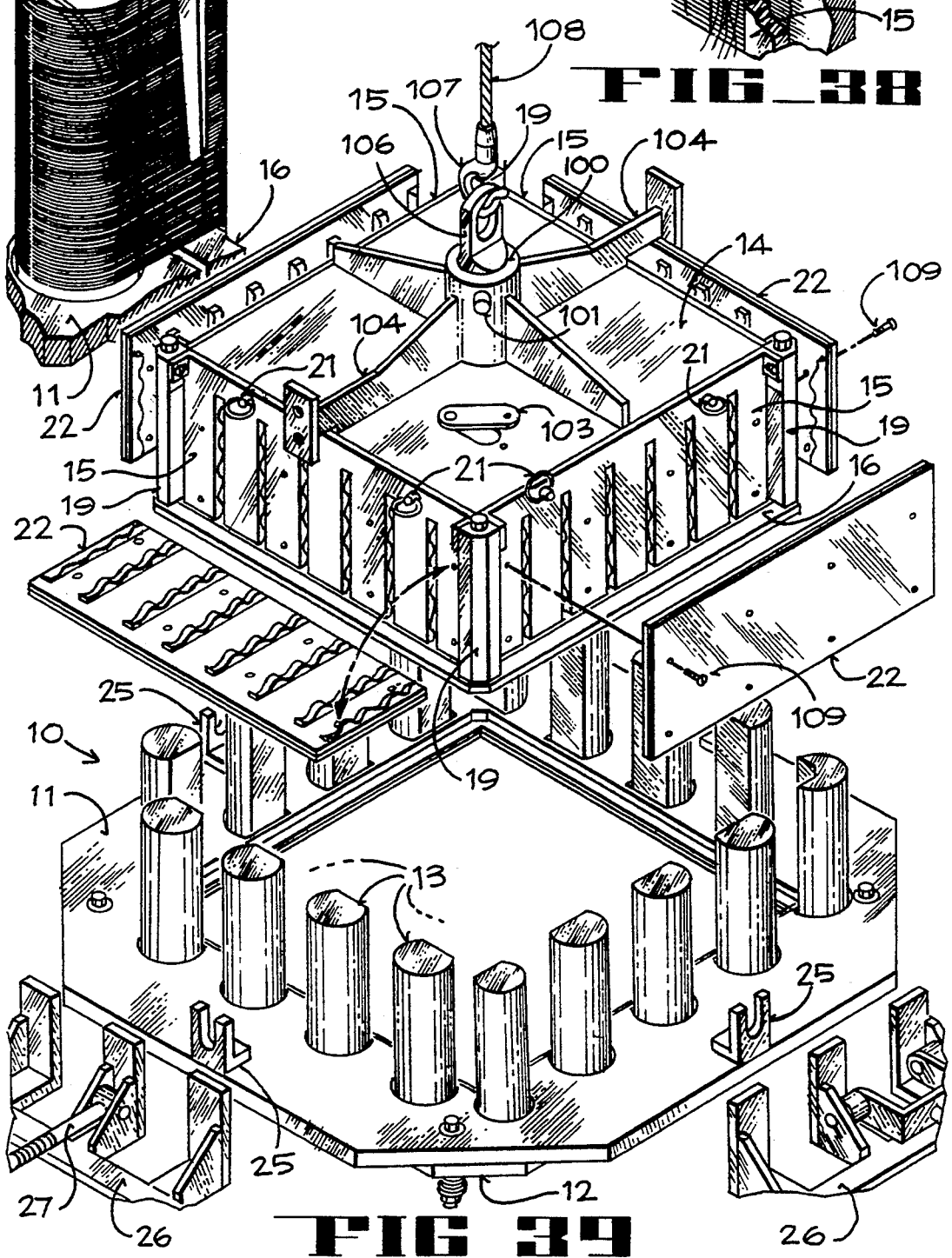

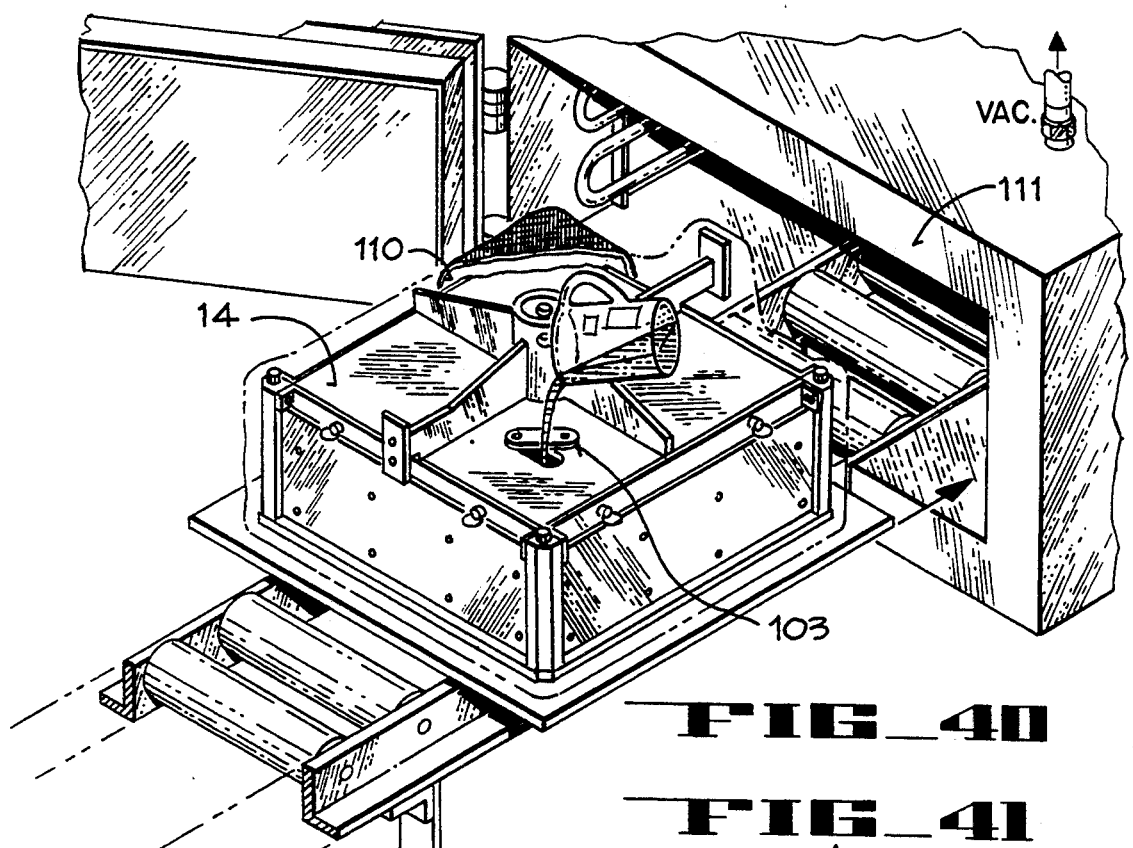
FIG_40
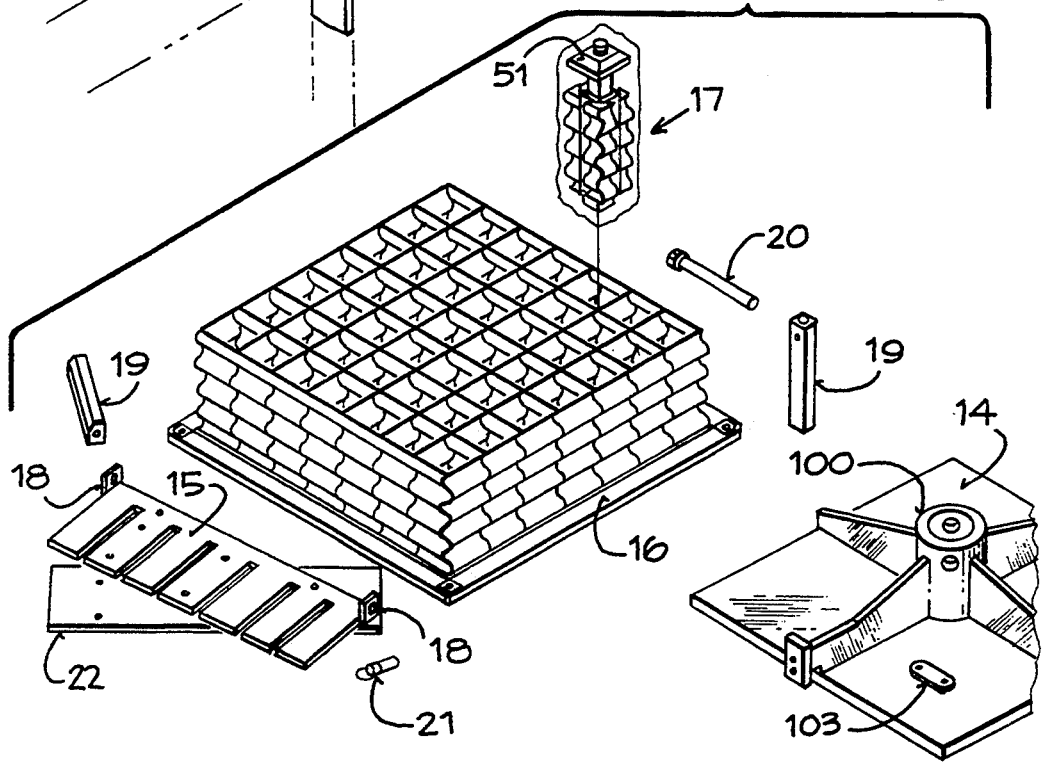
FIG_41

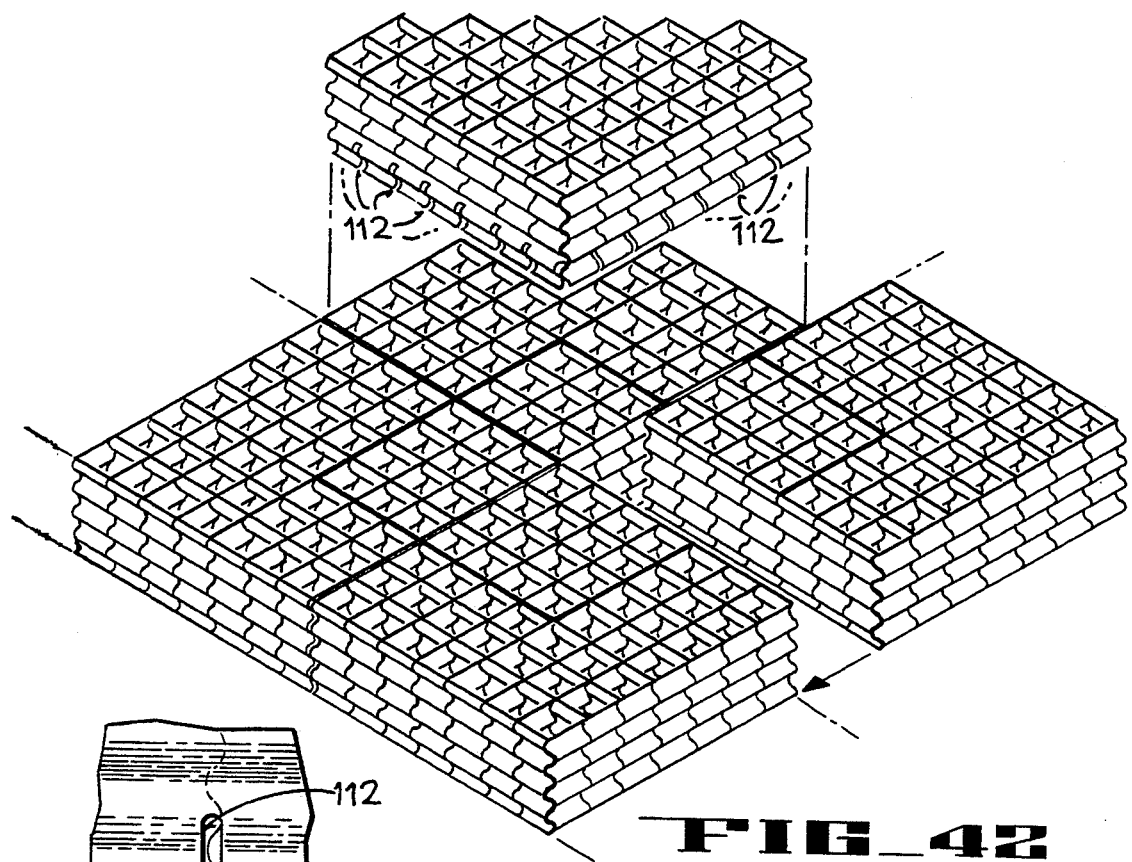
FIG_42
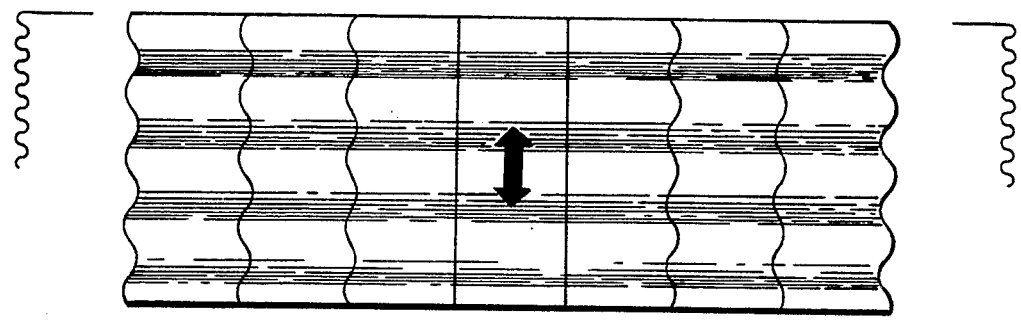
FIG_43
FIG_44

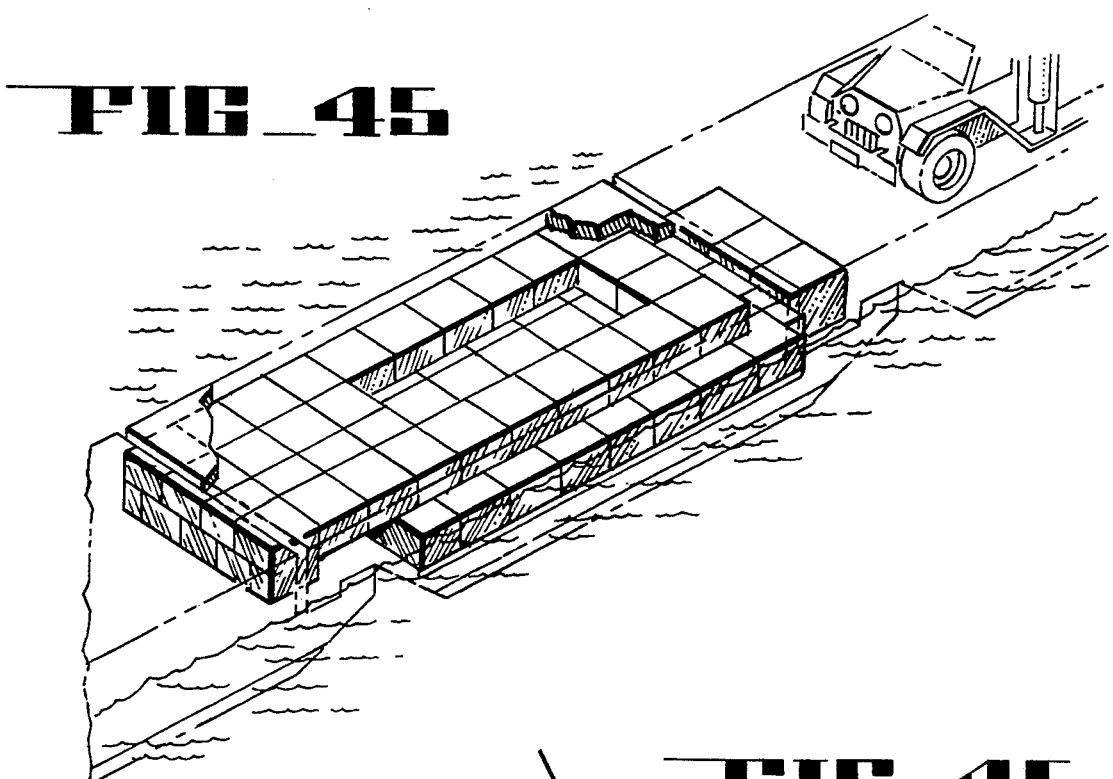
FIG_45
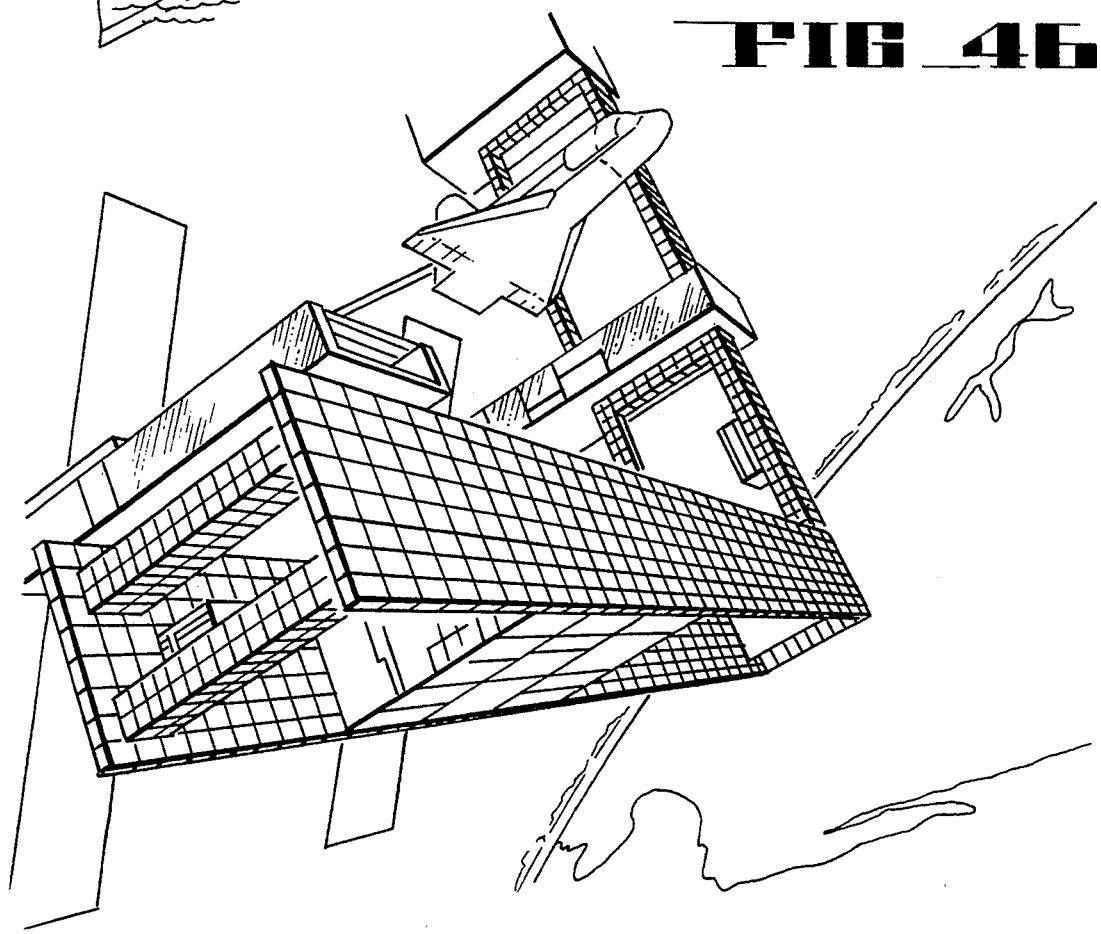
FIG_46

GRID STRUCTURE WITH SINUOUS INTERSTICES

TECHNICAL FIELD

This invention relates generally to the fabrication of grid structures, and more particularly to a technique for fabricating a grid structure having sinuous interstices.

BACKGROUND OF THE INVENTION

A technique was disclosed in co-pending U.S. patent application Ser. No. 07/286,120, filed on Dec. 19, 1988, for fabricating grid structures of various configurations from a composite material consisting of fibers embedded in a matrix—e.g., graphite fibers embedded in an epoxy resin matrix.

A grid structure fabricated according to the technique disclosed in the aforementioned U.S. patent application Ser. No. 07/286,120 comprises intersecting grid sections, which define interstices of the grid structure. The intersecting grid sections interpenetrate each other without causing the integrity of any of the intersecting grid sections to be breached. Consequently, the technique disclosed in U.S. patent application Ser. No. 07/286,120 enables substantial uniformity in strength to be achieved without producing significant variations in weight distribution throughout the grid structure.

A grid structure according to the technique disclosed in the aforementioned U.S. patent application Ser. No. 07/286,120 is fabricated by the following procedure:

a) a filament made of fibrous material is arranged on a loom according to an iterative pattern so as to form intersecting grid sections, which define interstices of the grid structure that is to be fabricated;

b) filaments made of fibrous material are wound or wrapped around mandrels, which generally conform in cross-sectional configuration to the interstices defined by the intersecting grid sections;

c) the mandrels with the filaments of fibrous material wound or wrapped thereon are inserted into corresponding interstices of the grid structure;

d) the filament that is arranged on the loom so as to form the intersecting grid sections defining the interstices, as well as the filaments that are wound or wrapped around the mandrels inserted into the interstices, are impregnated with a liquid matrix material;

e) the filaments, after having been impregnated with the liquid matrix material, are then compressed between the mandrels in adjacent interstices;

f) the matrix material is then cured; and g) the mandrels are removed from the interstices.

Intersecting grid sections defining the interstices of a grid structure that is fabricated according to the above-listed steps (as previously disclosed in U.S. patent application Ser. No. 07/286,120) can have planar or arcuate surfaces, depending upon the configuration of the loom and the mandrels. Prior to the present invention, however, no technique had ever been devised for imparting an undulate configuration to the surfaces of the intersecting grid sections defining the interstices of a grid structure.

SUMMARY OF THE INVENTION

It is an object of the present invention to provide a technique for fabricating a grid structure having interstices that are defined by intersecting grid sections with undulate surfaces—so that the interstices of the grid structure as defined by the intersecting grid sections are sinuous.

In accordance with the present invention, a filament made of a fibrous material is arranged in an iterative pattern on a loom to form intersecting grid sections that define interstices of the grid structure to be fabricated. Various types of looms that can be used in fabricating grid structures are described in the aforementioned U.S. patent application Ser. No. 07/286,120. Intersecting grid sections defining the interstices of the grid structures disclosed in the aforementioned U.S. patent application Ser. No. 07/286,120 can be planar or arcuate, but have smooth (i.e., non-undulate) surfaces. In order to produce intersecting grid sections with undulate surfaces, a new technique according to the present invention must be used.

In fabricating a grid structure according to the present invention, just as in fabricating a grid structure as disclosed in the aforementioned U.S. patent application Ser. No. 07/286,120, a loom is used on which intersecting grid sections are formed to define interstices in a specified type of array. However, in accordance with the present invention, the solid mandrels disclosed in U.S. patent application Ser. No. 07/286,120 are replaced by hollow segmented mandrels, which are used in combination with expander devices to impress an undulate configuration on the surfaces of the grid intersecting sections.

In the exemplary embodiment of a grid structure according to the present invention as described herein, the interstices are arranged in a rectangular array, and each of the interstices is sinuous with a square transverse cross-sectional configuration. Therefore, the loom to be used (as described herein) enables a rectangular array of interstices to be formed wherein each interstice is of square cross-sectional configuration. However, it is anticipated that other types of looms could be used, in combination with appropriately configured segmented mandrels and expander devices, to form intersecting grid sections that define interstices arranged in different types of arrays, where the interstices have different kinds of cross-sectional configurations (i.e., cross-sectional configurations other than square).

In accordance with the present invention, sleeve-like cocoons made of filaments of fibrous material are fitted into corresponding interstices, and the hollow segmented mandrels are then inserted into the cocoons within the corresponding interstices. In the exemplary embodiment of the present invention in which the interstices are of square transverse cross-sectional configuration, each hollow segmented mandrel comprises eight separate die-plate components held together by spring clips. The die-plate components have undulate outer surfaces, which are configured according to the particular undulate configuration that is to be imparted to the surfaces of the intersecting grid sections.

In the embodiment of the invention illustrated herein, the intersecting grid sections are formed by winding a graphite filament in an iterative pattern on the loom; and the cocoons are made from so-called "prepreg" sheets (i.e., from a commercially available product comprising graphite fibers extending generally in the same direction and impregnated with an uncured epoxy resin). Thus, in the illustrated embodiment, the grid structure that is produced consists of a graphite-epoxy composite material—which is especially suitable in certain aerospace applications. However, the technique of the present invention for fabricating grid structures with sinuous interstices is not limited in practice to the use of any particular kind of fibrous material and/or matrix material.

After the hollow segmented mandrels according to the present invention have been inserted into the cocoons in the corresponding interstices, the mandrels are then expanded laterally outward so that pressure is thereby applied to the cocoons and to the grid sections that are sandwiched between mandrels in adjacent interstices. The undulate outer surfaces on the die-plate components of the mandrels cause a similar undulate configuration to be imparted to the cocoons and grid sections that are compressed together between the adjacent mandrels.

If the cocoons are made of "prepreg" sheets, some epoxy resin impregnating the fibers of the cocoons passes from the cocoons into the fibers of the intersecting grid sections that are sandwiched between adjacent cocoons when vacuum and heat are applied. However, if the cocoons are made of something other than "prepreg" sheets (e.g., a foil of fibrous material), it would be necessary to apply a matrix material (e.g., liquid epoxy resin) to the cocoons and/or to the fibrous material comprising the grid sections before vacuum and heat are applied. In either event, the matrix material saturating the fibrous material is cured by the vacuum-heat treatment process, which may be conventional. After the matrix material has cured, superfluous portions (called "flashings") of the intersecting grid sections are trimmed away, leaving a grid structure with sinuous interstices defined by intersecting grid sections having undulate surfaces.

DESCRIPTION OF THE DRAWING

FIG. 1 is a perspective view of a grid structure according to the present invention whose interstices are defined by intersecting grid sections having undulate surfaces.

FIG. 2 is a perspective view of a loom for use in fabricating a grid structure with interstices defined by undulate intersecting grid sections as illustrated in FIG. 1.

FIG. 3 is an exploded perspective view of the loom illustrated in FIG. 2.

FIG. 4 is an exploded perspective view showing details of certain components of the loom illustrated in FIG. 2.

FIG. 5 is a perspective view of a base member of the loom illustrated in FIG. 2 indicating an iterative pattern in which a fibrous filament is arranged on the loom to form intersecting grid sections.

FIG. 6 is an exploded perspective view of the loom illustrated in FIG. 2 showing the intersecting grid sections formed thereon.

FIG. 7 is a perspective view of a hollow segmented mandrel according to the present invention for insertion into a cocoon within an interstice defined by intersecting grid sections formed on the loom illustrated in FIG. 2.

FIG. 8 is a perspective view of the hollow segmented mandrel of FIG. 7 after having been inserted into a cocoon within an interstice defined by intersecting grid sections, and after having subsequently been laterally expanded.

FIG. 9 is a diagrammatic transverse cross-sectional view in the plane of the upper surface of a floor plate positioned in the apertured central portion of the base member of the loom as illustrated in FIG. 5, before the mandrels in the cocoons within the corresponding interstices have been laterally expanded.

FIG. 10 is a diagrammatic transverse cross-sectional view as in FIG. 9, after the mandrels in the cocoons within the corresponding interstices have been laterally expanded.

FIG. 11 is an enlarged transverse cross-sectional view in the same plane as in FIGS. 9 and 10 in which interstices defined by intersecting grid sections formed on the loom illustrated in FIG. 2 are illustrated, where a mandrel in "relaxed" configuration (i.e., before being laterally expanded) is shown in one corner interstice and a mandrel in "tightened" configuration (i.e., after having been laterally expanded) is shown in another corner interstice.

FIG. 12 is an exploded perspective view of assembled die-plate components and spring clips of the hollow segmented mandrel illustrated in FIG. 7.

FIG. 13 is a perspective view of a jig in open configuration for making a pattern with undulate surfaces, which can be used to fabricate the die-plate components of the hollow segmented mandrel illustrated in FIG. 7.

FIG. 14 is a perspective view of the jig of FIG. 13 in closed configuration.

FIG. 15 is a perspective view of a pattern with undulate surfaces made on the jig illustrated in FIGS. 13 and 14.

FIG. 16 is a longitudinal cross-sectional view of the pattern and jig illustrated in FIG. 14.

FIG. 18 is an exploded perspective view of an expander bolt for insertion into the hollow segmented mandrel illustrated in FIG. 7.

FIG. 19 is a longitudinal cross-sectional view of the hollow segmented mandrel as illustrated in FIG. 7 in "relaxed" configuration, after having been inserted into a corresponding interstice.

FIG. 20 is a longitudinal cross-sectional view of the hollow segmented mandrel as illustrated in FIG. 8 in "tightened" configuration within the corresponding interstice.

FIG. 21 is a longitudinal cross-sectional view of the hollow segmented mandrel in an intermediate configuration between the "relaxed" configuration shown in FIG. 19 and the "tightened" configuration shown in FIG. 20.

FIG. 22 is a transverse cross-sectional view of the hollow segmented mandrel along line 22—22 of FIG. 21.

FIG. 23 is a transverse cross-sectional view of the hollow segmented mandrel along line 23—23 of FIG. 21.

FIG. 24 is a perspective view of the loom as illustrated in FIG. 6 with comb plates secured to the floor plate in the apertured central portion of the base member of the loom.

FIG. 25 is a perspective view of a "prepreg" sheet from which a cocoon as indicated in FIG. 6 can be fabricated.

FIG. 26 is a perspective view of a cocoon fabricated from the "prepreg" sheet illustrated in FIG. 25.

FIG. 27 is a perspective view of a four-sided anvil for use in installing a cocoon within a corresponding interior interstice defined by intersecting grid sections formed on the loom illustrated in FIG. 24.

FIG. 28 is a perspective view of an anvil plate for use in installing a cocoon within a corresponding exterior interstice defined by intersecting grid sections formed on the loom illustrated in FIG. 24.

FIG. 29 is a perspective view of a spreading tool for insertion into an interior interstice to press a cocoon within the interstice against adjacent grid sections defining the interstice on the loom illustrated in FIG. 24.

FIG. 30 is a perspective view of a portion of the loom as illustrated in FIG. 24 in which use of the anvil of FIG. 27, the anvil plate of FIG. 28 and the spreading tool of FIG. 29 is illustrated.

FIG. 31 is a transverse cross-sectional view of a representative interstice as indicated in FIG. 30 with a cocoon positioned therein, and with a spreading tool as illustrated in FIG. 29 in "relaxed" configuration within the cocoon.

FIG. 32 is a transverse cross-sectional view of the representative interstice of FIG. 31 in which the spreading tool within the cocoon has been changed to the "tightened" configuration.

FIG. 33 is a perspective view of the loom as illustrated in FIG. 24 showing cocoons and hollow segmented mandrels inserted into corresponding interstices defined by the intersecting grid sections.

FIG. 34 is a perspective view of the loom of FIG. 33 illustrating the application of compressive forces to the cocoons and adjacent grid sections.

FIG. 35 is a longitudinal cross-sectional view of the loom along line 35—35 of FIG. 34.

FIG. 36 is an enlarged cross-sectional view of a portion of the loom as illustrated within region 36—36 of FIG. 35.

FIG. 37 is a perspective view illustrating portions of grid sections in the vicinity of posts on the loom of FIG. 34 being cut away.

FIG. 38 is a perspective view illustrating dangling fibrous grid-section threads being tucked into gaps between tooth portions of comb plates on the loom of FIG. 34.

FIG. 39 is a perspective view of an enclosed box defined by the comb plates, a floor plate and a top pressure plate (within which the grid sections are in compression) being removed from the loom of FIG. 34.

FIG. 40 is a perspective view illustrating a vacuum process for saturating grid sections within the box shown in FIG. 39 with epoxy resin, and also illustrating a heat-treatment process for curing the epoxy resin.

FIG. 41 is a perspective view illustrating removal of the fabricated grid structure from the box shown in FIG. 39 after the heat-treatment process of FIG. 40 has been completed.

FIG. 42 is a perspective view illustrating a technique for interlocking a plurality of grid structures according to the present invention to form a larger structure.

FIG. 43 is an enlarged plan view of an edge portion of a mating surface of one of the interlocking grid structures as illustrated in FIG. 42.

FIG. 44 is a longitudinal cross-sectional view of an alternative embodiment of a grid structure according to the present invention in which the undulate surfaces of different have sinuosities of correspondingly different amplitude.

FIG. 45 is a perspective view of a conceptualized pontoon bridge comprising an assemblage of grid structures according to the present invention.

FIG. 46 is a perspective view of a conceptualized extraterrestrial space structure comprising an assemblage of grid structures according to the present invention.

BEST MODE OF CARRYING OUT THE INVENTION

Figure 17:
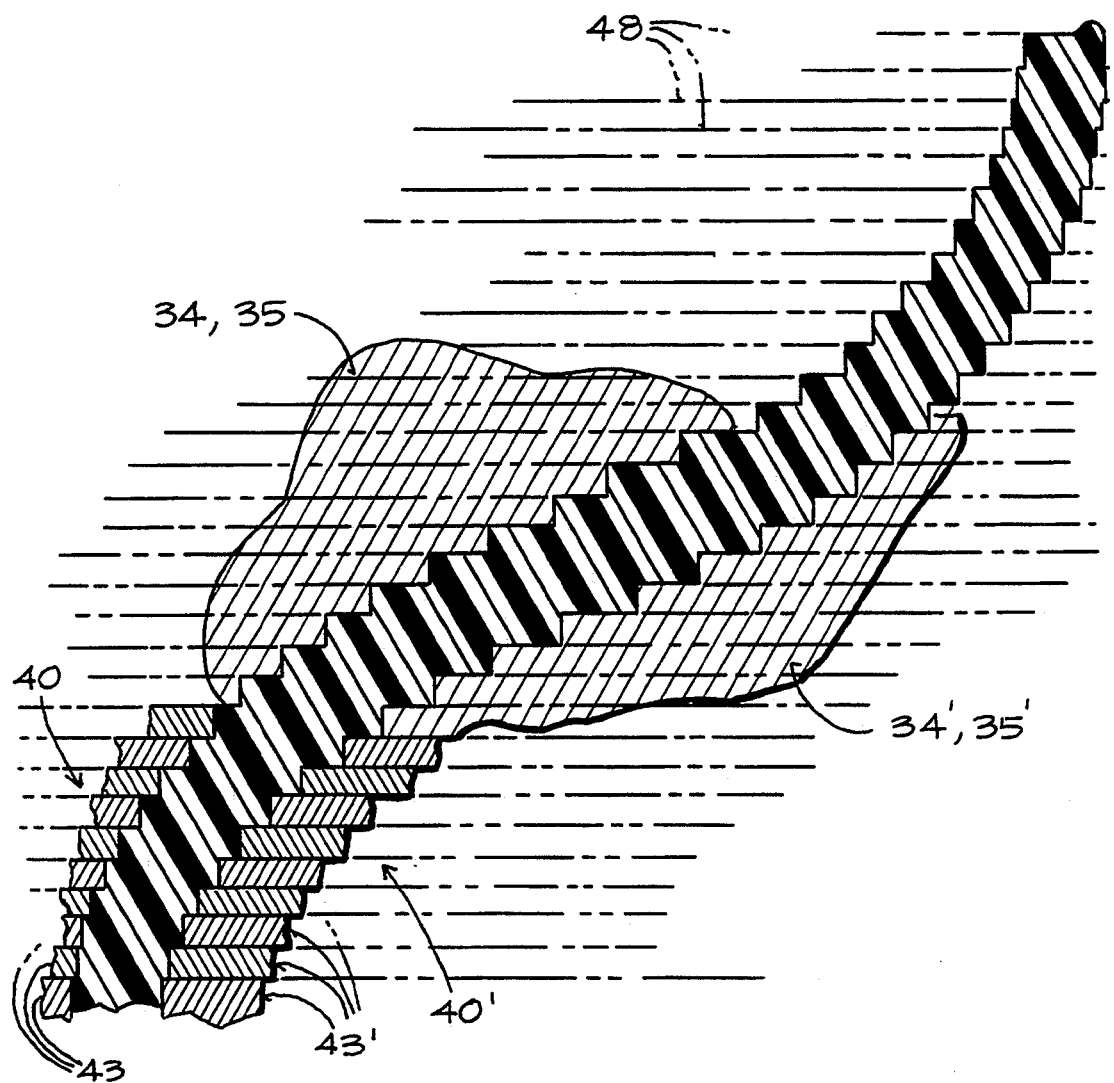
FIG. 17 is an enlarged longitudinal cross-sectional view of a portion of a grid section compressed between laterally expanded mandrels in adjacent interstices, where surface portions of the die-plate components of the hollow segmented mandrels have stepwise discontinuities according to a particular embodiment of the present invention so as to impart corresponding stepwise discontinuities to the surface of the grid section.

In FIG. 1, an example of a grid structure with sinuous interstices according to the present invention is illustrated. The interstices of a grid structure according to the present invention are defined by intersecting grid sections with undulate surfaces. In a particular embodiment of the present invention, the intersecting grid sections defining the interstices of the grid structure are made of a composite material consisting of fibers (e.g., graphite fibers) embedded in a matrix (e.g., epoxy resin).

To fabricate a grid structure as shown in FIG. 1, a fibrous filament is arranged in an iterative pattern on a loom whose configuration and dimensions are specified so as to determine the size and shape of the grid structure. In a particular embodiment of the invention, the fibrous filament consists of graphite fibers. In FIG. 2, a loom 10 is shown, which is of a type that makes possible the fabrication of a particular kind of grid structure— viz., a grid structure characterized by a square array of interstices, where each interstice of the array has a square transverse cross section as illustrated in FIG. 1. To fabricate grid structures of other configurations, correspondingly configured and dimensioned looms of other types would have to be used.

The loom 10 shown in FIG. 2 comprises a planar base member 11, which is fixedly secured in a conventional manner to an appropriate work stand. A central portion of the base member 11 is apertured in a configuration that dimensionally conforms to the transverse cross-sectional configuration of the grid structure to be fabricated on the loom 10. Thus, the central portion of the base member 11 as shown in FIG. 2 is a square aperture. Four rows of "post hole" apertures are also provided in the base member 11 adjacent the corresponding four sides of the square central aperture.

The loom 10 further comprises a frame member 12, which is supported on compression-spring mountings (as described hereinafter) underneath the planar base member 11 for motion perpendicularly (i.e., vertically) with respect to the base member 11. The frame member 12 is a planar structure with a square central aperture that is aligned with, and has generally the same dimensions as, the square-apertured central portion of the base member 11. Four rows of vertically extending posts 13 are fixedly secured on the frame member 12 (as by machine screws) so as to extend upward through corresponding "post hole" apertures in the base member 11. The posts 13 surround the square central aperture in the base member 11, and generally demarcate four sides of a working volume.

A square floor plate (not visible in FIG. 2) is received within the square-apertured central portion of the base member 11 to provide a bottom for the working volume. A top for the working volume is provided by a top pressure plate 14, whose function is described in detail hereinafter. Four comb plates 15, which are secured to corner portions of the floor plate in a manner described hereinafter, provide corresponding sides for the working volume. The fibrous filament is wound in an iterative pattern around the posts 13 (as described and illustrated hereinafter) so as to form two mutually orthogonal sets of intersecting planar grid sections within the working volume. In operation, the comb plates 15 retain the two sets of intersecting planar grid sections in substantially orthogonal disposition with respect to each other.

As indicated in FIG. 2, the comb plates 15 have tab portions that are secured (as by screws) to four vertically extending tubular columns, which are positioned at the corners of the working volume inside the rows of "post hole" apertures on the base member 11. As described more fully hereinafter, the tubular columns are secured to four corner portions of the square floor plate by means of longitudinally extending screws therethrough. Thus, the floor plate, the comb plates 15 and the top pressure plate 14 effectively form an enclosed "package" in which the intersecting grid sections defining the interstices of the grid structure of the present invention are formed.

FIG. 3 provides an exploded view of the loom 10 in which the floor plate (which is hidden in the perspective of FIG. 2), as well as the tubular columns and the various components that can be seen in the perspective of FIG. 2, are illustrated in interconnected detail. The floor plate, indicated by reference number 16, is fitted into the square-apertured central portion of the base member 11. In the preferred embodiment of the invention, a peripheral edge portion of the floor plate 16 is received on an inside recessed ledge portion of the base member 11 that surrounds the square-apertured central portion thereof. The floor plate 16 has a latticed (i.e., "waffled") surface appearance in which an array of openings of square transverse cross section are separated from each other by orthogonally intersecting strips. The recessed ledge portion of the base member 11 is dimensioned so that the upper surface of the floor plate 16, whose edge portion is received thereon, is flush with the upper surface of the base member 11.

The intersecting strips of the floor plate 16 are related to the spacing between the posts 13 so that the intersecting planar grid sections, which formed by winding the fibrous filament iteratively around the posts 13, are aligned with corresponding surface strips on the floor plate 16. The interstices defined by the intersecting planar grid sections are thereby aligned with corresponding openings on the floor plate 16. The openings on the floor plate 16 are dimensioned to receive bottom portions of corresponding segmented mandrels 17, only one of which is shown in FIG. 3. Each of the mandrels 17 is hollow, and comprises two sets of die-plate components—viz., a set of corner components and a set of wedge components, as described hereinafter—which are held together by spring clips. Outwardly facing surfaces of the die-plate components of the mandrels 17 are undulately configured according to the particular configuration that is to be imparted to the surfaces of the intersecting grid sections defining the interstices of the grid structure to be fabricated.

Tooth portions of the comb plates 15 enclosing the sides of the working volume have undulate inwardly facing surfaces, which are configured to "complement" the undulate configuration of the outwardly facing surfaces of the die-plate components of the mandrels 17. Thus, if the inwardly facing undulate surfaces of the tooth portions of the comb plates 15 and the outwardly facing undulate surfaces of the die-plate components of the mandrels 17 were to be pressed together, substantially continuous contact between the oppositely facing undulate surfaces would be made over the entire surfaces.

As indicated in FIG. 3, tab portions 18 of the comb plates 15 extend perpendicularly outward from side edges thereof. The tab portions 18 of the comb plates 15 abut corresponding sides of the tubular columns, indicated by reference number 19, and are secured thereto by machine screws. The tubular columns 19 are secured to corresponding corner portions of the floor plate 16 by means of screws 20 extending longitudinally therethrough, which are received in aligned screw-threaded bores on the corner portions of the floor plate 16. The comb plates 15 are thereby assembled as the walls of a closed box of which the floor plate 16 is the bottom. The top pressure plate 14 serves as a top for the box, which encloses the working volume. The comb plates 15 are secured to the top pressure plate 14 by means of quick-release pins 21, which extend through holes in the comb plates 15 that are aligned with corresponding bores in side edges of the top pressure plate 14.

Also shown in FIG. 3 are four cover plates 22, which are not used in operation until an appropriate time is reached for initiating a process as described hereinafter for curing the matrix (e.g., epoxy resin) in which the fibers comprising the intersecting grid sections are embedded. When the curing process is to be initiated, segments of the fibrous filament outside the working volume in the vicinity of the posts 13 are cut away; and the four cover plates 22 are then secured (as by screws) to the corresponding comb plates 15 in abutting contact with outwardly facing sides thereof.

The sides of the cover plates 22 in contact with the outwardly facing sides of the comb plates 15 have inwardly projecting protrusions, which are positioned and dimensioned to fit within corresponding gaps between adjacent tooth portions of the comb plates 15. The protrusions on the cover plates 22 have undulate surfaces, which are configured to complement the undulate configuration of the outwardly facing surfaces of the die-plate components of the mandrels 17. Thus, when the cover plates 22 are secured to the comb plates 15, the protrusions on the cover plates 22 effectively "fill in" the gaps between adjacent tooth portions of the comb plates 15. The four comb plates 15 with "filled in" gaps thereby form substantially continuous surfaces of undulate configuration, which abut the four corresponding outside grid sections that define the sides of the grid structure to be fabricated.

Also shown in FIG. 3 are four adjustable abutment devices 23, whose function is described in detail hereinafter. The abutment devices 23 are secured to the base member 11 adjacent corresponding rows of posts 13 that define the four sides of the working volume. The abutment devices 23 are used to apply lateral compressive forces to cocoons (as described hereinafter) around the mandrels 17 in corresponding interstices defined by the intersecting grid sections, and to the grid sections in contact with the cocoons, within the working volume. The frame member 12 to which the posts 13 are secured is supported on compression-spring mountings (as mentioned previously), which are indicated in FIG. 3 by reference number 24. The posts 13 can move vertically up and down within the "post hole" apertures in the base member 11 in response to downward forces applied to the posts 13 by the top pressure plate 14—as discussed hereinafter.

In FIG. 4, the base member 11 is seen to be substantially planar. The square-apertured central portion of the base member 11 is dimensioned to receive the floor plate 16 so that the peripheral edge portion of the floor plate 16 is lies on the recessed ledge portion of the base member 11. The frame member 12 is aligned with the base member 11 so that the posts 13, which are fixedly secured to the frame member 12, extend upward through the corresponding "post hole" apertures in the base member 11 adjacent the sides of the square-apertured central portion thereof.

As illustrated in FIG. 4, each of the abutment devices 23 comprises a stationary member 25, a sliding member 26, and a screw-threaded adjustment member 27. The stationary member 25 is fixedly secured to the base member 11. The sliding member 26 rests on the base member 11 in sliding contact therewith. The adjustment member 27 links the stationary member 25 and the sliding member 26, and enables the sliding member 26 to be moved on the upper surface of the base member 11 inwardly or outwardly with respect to the floor plate 16 in the central aperture of the base member 11—i.e., toward or away from the comb plate 15 on the corresponding side of the working volume. A surface of each of the sliding members 26 in contact with the upper surface of the base member 11 is preferably coated with a material having a low coefficient of friction (e.g., polytetrafluoroethylene, a commercially available product marketed under the trademark Teflon) to facilitate sliding thereof over the upper surface of the base member 11 in response to activation of the adjustment member 27.

The adjustment member 27 of each abutment device 23 is an elongate rod, which has a proximal end that is hingedly attached to the sliding member 26, and a screw-threaded distal end that is supported in a notched portion of the stationary member 25. Movement of the sliding member 26 inward or outward with respect to the working volume is accomplished by tightening or loosening a nut on the distal end of the adjustment member 27. Since the upper surface of the floor plate 16 is flush with the upper surface of the base member 11, the surface of the sliding member 26 in contact with the upper surface of the base member 11 can be moved onto the peripheral edge portion of the floor plate 16 by tightening the nut on the distal end of the adjustment member 27 sufficiently.

The sliding member 26 of each abutment device 23 has a number of pressure pads 28, which are positioned and dimensioned so as to pass between adjacent posts 13. The pressure pads 28 on each sliding member 26 thereby press against corresponding portions of the comb plate 15 on the corresponding side of the working volume. As the four sliding members 26 move onto corresponding peripheral edge portions of the floor plate 16 on the four sides of the working volume, the pressure pads 28 on the sliding members 26 thereby impart lateral compressive forces to the intersecting grid sections defining the outer interstices of the grid structure and to the cocoons positioned in the outer interstices.

In the particular embodiment of the invention illustrated in FIG. 4, the posts 13 support the fibrous filament in an iterative pattern that results in the formation of two sets of orthogonally intersecting grid sections, which define a square array consisting of seven interstices on each side. Thus, as illustrated, in order to provide seven interstices on each side, the sliding members 26 on two sides of the working volume have three pressure pads 28 each, and the sliding members 26 on the other two sides of the working volume have four pressure pads 28 each.

In FIG. 5, the iterative pattern in which the fibrous filament is arranged on the loom 10 is indicated in perspective view. In order to wind the filament around the posts 13, the sliding member 26 and the adjustment member 27 of each of the abutment devices 23 are removed from the base member 11; and poles for use in winding the filament are positioned fixedly (but temporarily) adjacent diagonally opposite corners of the base member 11. Thus, as indicated in FIG. 5, a first starting pole 29 is positioned adjacent a corner of the base member 11 in the vicinity of a first one of the posts 13, which is designated in FIG. 5 by the reference number 13'. A second starting pole 30 is positioned adjacent the diagonally opposite corner of the base member 11. One end of the filament is then secured (as by tying) to the first starting pole 29, and the filament is then drawn (as from a spool) around the first post 13' through an approximately 90-degree turn so as to pass in a direction parallel to a first side of the central aperture of the base member 11 to a particular post 13$a$ positioned adjacent the laterally opposite corner of the central aperture. The filament is then turned through 180 degrees around the corner post 13$a$, and is drawn (again parallel to the same first side of the central aperture but in the opposite direction) back to a post 13$b$ adjacent the first post 13'.

The filament continues to be wound iteratively from post 13$b$ to post 13$c$, from post 13$c$ to post 13$d$, etc., back and forth along parallel paths across the apertured central portion of the base member 11 until post 13$h$ is reached adjacent a corner of the central aperture diagonally opposite the position of the post 13$a$. The filament is turned through 270 degrees around the post 13$h$, and then passes in a direction perpendicular to the first side of the central aperture of the base member 11 to a post 13$i$. The filament is then turned through 180 degrees around the post 13$i$, and is drawn (again perpendicular to the first side of the central aperture but in the opposite direction) back to a post 13$j$ adjacent the post 13$h$. The filament continues to be wound iteratively from post 13$j$ to post 13$k$, from post 13$k$ to post 13$l$, etc., back and forth along parallel paths across the apertured central portion of the base member 11 until post 13$p$ is reached adjacent a corner of the central aperture diagonally opposite the position of the first post 13'. At the post 13$p$, the filament is drawn through an approximately 90-degree turn so as to wind around the second starting pole 30.

The filament is turned through approximately 180 degrees around the second starting pole 30, and is then re-wound around the posts 13 in reverse sequence (i.e., from post 13$p$ to post 13$o$, from post 13$o$ to post 13$n$, etc.) until post 13$a$ is reached, whereupon the filament is turned by 180 degrees toward the first post 13'. At the first post 13', the filament is turned through approximately 90 degrees so as wind again around the first starting pole 29. Thereafter, the filament is again wound in the same iterative pattern around the posts 13, from the first post 13' sequentially around the posts 13$a$, 13$b$, ..., and 13$p$ to the second starting pole 30, and then in reverse sequence around the posts 13$p$, 13$o$, ..., and 13$a$ to the first post 13', and then back to the first starting pole 29, whereupon the winding procedure is repeated as many times as necessary to form intersecting planar grid sections of a desired height.

In FIG. 6, the loom 10 is shown with the fibrous filament arranged thereon to form the intersecting planar grid sections. The first post 13' is seen in FIG. 6 to have a longitudinally extending groove, which is machined into a surface portion thereof facing outwardly from the working volume. A similar groove is likewise provided on a surface portion of the post 13p facing outwardly from the working volume. After the intersecting planar grid sections have been formed, a felt locking strip 31 is pressed over the filament into the groove on the first post 13', and a felt locking strip 32 is likewise pressed over the filament into the groove on the diagonally opposite post 13p. The felt locking strips 31 and 32 secure the filament within the grooves on the posts 13' and 13p.

After the felt locking strips 31 and 32 have been put in place, the portion of the filament between the first starting pole 29 and the first post 13', and also the portion of the filament between the second starting pole 30 and the post 13p, are cut away; and the starting poles 29 and 30 are removed. The four comb plates 15 secured to the tubular columns 19 are then positioned perpendicularly on corresponding peripheral portions of the floor plate 16, and are secured to the corner portions of the floor plate 16 by means of the screws 20 extending through the tubular columns 19. The sliding members 26 of the abutment devices 23 (with the adjustment members 27 attached thereto), as shown in FIG. 4, are then secured to the corresponding stationary members 25 for sliding movement on the upper surface of the base member 11.

As illustrated in FIG. 6, a corresponding one of the aforementioned cocoons (indicated by reference number 33) is inserted into each of the interstices formed by the intersecting planar grid sections; and a corresponding one of the hollow segmented mandrels 17 is inserted into each of the cocoons 33. The cocoons 33 are made of the same kind of fibrous material as the filament arranged on the loom 10 to form the intersecting grid sections. Each cocoon 33 has a generally square transverse cross section, and in the preferred embodiment of the invention comprises predominantly longitudinally extending filamentary fibers. When the cocoons 33 are in place within the corresponding interstices, the longitudinally extending fibers of the cocoons 33 extend generally orthogonally with respect to the fibrous filament that has been arranged on the loom 10 to form the intersecting grid sections.

As described in detail hereinafter, the mandrels 17 assume a "relaxed" configuration while being inserted into the corresponding interstices defined by the intersecting grid sections. In "relaxed" configuration, the mandrels 17 have a minimum transverse cross-sectional dimension, and do not exert outwardly directed lateral forces against the surrounding cocoons 33. Thereafter, while positioned within the interstices, the mandrels 17 are laterally expanded—i.e., converted to a "tightened" configuration in which the transverse cross-sectional dimension of the mandrels 17 becomes a maximum. When in "tightened" configuration within the interstices, the mandrels 17 exert outwardly directed forces perpendicularly against the sides of the surrounding cocoons 33—thereby compressing the cocoons 33 against the adjacent grid sections.

In the preferred embodiment of the invention, the cocoons 33 are impregnated with uncured epoxy resin (as described hereinafter), and hence are tacky and tend to stick to the intersecting grid sections when the mandrels 17 are laterally expanded. The fibrous material of the cocoons 33, when compressed by the mandrels 17 against the adjacent grid sections, bonds with the fibrous material of the adjacent grid sections to form webs consisting of filamentary fibers that extend in two generally orthogonal dimensions. These webs, after completion of the process detailed hereinafter, become the grid sections of the grid structure that is to be fabricated.

In FIG. 7, a representative one of the hollow segmented mandrels 17 is shown in "relaxed" configuration. In FIG. 8, the same hollow segmented mandrel 17 is shown in "tightened" configuration. Each mandrel 17 comprises eight die-plate components (viz., a set of four corner components 34, and a set of four wedge components 35), which function in a manner described hereinafter. The eight die-plate components are held together by two spring clips 36 (only one of which is visible in FIG. 7) to form a hollow structure with undulate sides. Each mandrel 17 further comprises an elongate expander bolt 37, which is received axially within the hollow structure formed by the die-plate components (i.e., by the four corner components 34 and the four wedge components 35). When the mandrel 17 is in "relaxed" configuration (as shown in FIG. 7), the expander bolt 37 can be moved longitudinally downward within the hollow structure formed by the die-plate components—thereby causing the die-plate components to move transversely outward (i.e., to "expand") so as to convert the mandrel 17 to the "tightened" configuration (as shown in FIG. 8).

A bottom end portion of the expander bolt 37 of each mandrel 17 is configured to be received within a corresponding opening on the floor plate 16, when the mandrel 17 is inserted in "relaxed" configuration into the corresponding interstice formed by the intersecting grid sections. When the bottom end portion of the expander bolt 37 is in position within the corresponding opening on the floor plate 16, a bottom surface of the hollow structure formed by the die-plate components of the mandrel 17 rests on a portion of the upper surface of the floor plate 16 around the opening.

In the preferred embodiment of the invention as illustrated in FIG. 7, gaskets 38 made of silicon rubber are pressed into grooves extending along the orthogonally intersecting strips that form the floor plate 16. The gaskets 38 form seals between the bottom surfaces of the mandrels 17 and the upper surface of the floor plate 16. These seals inhibit passage of liquid resin (as discussed hereinafter) into the interior of the hollow segmented mandrels 17. After the mandrels 17 have been inserted into the cocoons 33 in the corresponding interstices formed by the intersecting planar grid sections, the expander bolts 37 are then depressed (i.e., moved longitudinally downward) to cause the mandrels 17 to assume the "tightened" configuration.

In FIG. 9, a diagrammatic cross-sectional view of the loom 10 in a plane parallel to the upper surface of the floor plate 16 is shown in which cocoons 33 have been positioned in corresponding interstices defined by the intersecting grid sections, and mandrels 17 in "relaxed" configuration have been inserted into corresponding cocoons 33. Because the mandrels 17 are in "relaxed" configuration, the corner components 34 and the wedge components 35 forming the die-plate components of each mandrel 17 are spaced apart from adjacent portions of the intersecting grid sections. The mandrels 17 in the nine upper left-hand interstices shown in FIG. 9 are illustrated with the expander bolts 37 together with the eight die-plate components (i.e., the four corner components 34 and the four wedge components 35) that form the hollow structures in which the expander bolts 37 are received. However, in each of the remaining interstices shown in FIG. 9, only the eight die-plate components are shown: the expander bolts 37 are omitted in order to allow the die-plate components to be seen in starker detail.

In FIG. 10, a diagrammatic cross-sectional view of the loom 10 in the same plane as in FIG. 9 is shown in which the mandrels 17 have been converted to the "tightened" configuration. Because the mandrels 17 are in "tightened" configuration, the corner components 34 and the wedge components 35 that form the die-plate components of each mandrel 17 are in compressive contact with adjacent portions of the intersecting grid sections. The mandrels 17 in the nine upper left-hand interstices shown in FIG. 10 are illustrated with the expander bolts 37 together with the eight die-plate components that form the hollow structures in which the expander bolts 37 are received. However, in each of the remaining interstices shown in FIG. 10, only the eight die-plate components (i.e., the four corner components 34 and the four wedge components 35) are shown.

In FIG. 11, four corner portions of the loom 10 are illustrated in enlarged detail along with the intersecting planar grid sections formed thereon. A representative cocoon 33 and a representative mandrel 17 in "relaxed" configuration are illustrated in the upper left-hand corner interstice. Another representative cocoon 33 and a representative mandrel 17 in "tightened" configuration are illustrated in the lower left-hand corner interstice shown in FIG. 11.

The upper and the lower halves of the illustration in FIG. 11 represent different points in time: i.e., before and after the sliding members 26 of the abutment devices 23 have been moved so that the pressure pads 28 make compressive contact with the comb plates 15. While the mandrels 17 are still in "relaxed" configuration (as indicated in the upper half of FIG. 11), the sliding members 26 are kept away from the square-apertured central portion of the floor plate 16—so that the pressure pads 28 of the sliding members 26 do not make contact with the comb plates 15. As the expander bolts 37 are depressed to convert the mandrels 17 to the "tightened" configuration (as indicated in the lower half of FIG. 11), the sliding members 26 are moved toward the square-apertured central portion of the floor plate 16—so that the pressure pads 28 make compressive contact with the comb plates 15.

When the expander bolts 37 have been depressed so that the die-plate components of the mandrels 17 assume maximum transverse extension (i.e., are "expanded") within the corresponding interstices, and at the same time the pressure pads 28 of the sliding members 26 are in compressive contact with the comb plates 15, the cocoons 33 in the corresponding interstices are thereby compressed against adjacent grid sections. The overall effect of the conversion of all the mandrels 17 to the "tightened" configuration is to produce the webs that subsequently become the grid sections of the grid structure to be fabricated. The undulate configuration of the surfaces of the die-plate components of the mandrels 17 pressing against the cocoons 33 causes a substantially identical undulate configuration to be imparted to the resulting webs.

In FIG. 12, a technique is illustrated for assembling the hollow structure of each of the mandrels 17 from the constituent die-plate components (i.e., the four corner components 34 and the four wedge components 35). Each of the four corner components 34 is seen to be of generally triangular prismatic configuration; and each of the four wedge components 35 is seen to be of somewhat modified trapezoidal configuration. Two adjacent sides of each corner component 34 are orthogonal to each other (i.e., intersect at a right angle) to form a corner edge of the hollow structure. The two adjacent sides of the corner component 34 have undulate surfaces with a sinuosity that is substantially identical to the sinuosity desired for the interstices of the grid structure. The third side of each corner component 34 is planar. Each wedge component 35 has two parallel sides (one of which is shorter than the other), and two non-parallel sides. The shorter one of the two parallel sides of the wedge component 35 also has an undulate surface with a sinuosity that substantially conforms in period and amplitude to the sinuosity of the undulate surfaces of the adjacent corner components 34 that form the corner edges of the hollow structure. The larger one of the two parallel sides of the wedge component 35 is planar.

The two non-parallel sides of each of the wedge components 35 are also planar, and are angled (e.g., at 45 degrees) so as to make sliding contact with the planar sides of the adjacent corner components 34 located on either side of the wedge component 35 when the wedge component 35 is "wedged" between the two adjacent corner components 34. The undulate corner-forming sides of each of the corner components 34, and the undulate shorter of the two parallel sides of each of the wedge components 35, in combination with each other form the outer surface of the hollow structure of the mandrel 17. The planar longer ones of the parallel sides of the wedge components 35, in combination with each other, form the inner surface of the hollow structure of the mandrel 17.

As illustrated in FIG. 12, the constituent die-plate components (i.e., the four corner components 34 and the four wedge components 35) forming the hollow structure of the mandrel 17 are held together by means of a pair of spring clips 36 and 36'. Each of the spring clips 36 and 36' is generally four-sided, and each side thereof has scallop-like bends to provide a spring effect. A surface portion of a top end of each of the four wedge components 35 is contoured (as seen in the perspective of FIG. 12) to receive a corresponding side of one of the spring clips 36; and a surface portion of a bottom end (not visible in FIG. 12) of each of the four wedge components 35 is similarly contoured to receive a corresponding side of the other spring clip 36'. The hollow structure thereby formed is of generally square transverse cross section, and is dimensioned to receive the corresponding expander bolt 37 longitudinally therein.

Fastening of the four-sided spring clips 36 and 36' to the respective top and bottom ends of the hollow structure of each of the mandrels 17 is accomplished by configuring four corner portions of each of the spring clips 36 and 36' so as to fold around machine screws 39, which are driven into corresponding holes on the triangular ends at the tops and bottoms of the corner components 34. As described in greater detail hereinafter, the corresponding expander bolt 37 is inserted axially into the hollow structure of each of the mandrels 17. The expander bolt 37 can then be "tightened" so as to cause the four wedge components 35 to travel laterally outward (i.e., to "expand"), until the undulate surfaces of the wedge components 35 are flush with the undulate surfaces of the adjacent corner components 34.

In FIGS. 13, 14 and 15, a technique is illustrated for fabricating a pattern 40 (i.e., a model for making a mold into which molten metal can be poured to form a casting), which can be used to fabricate the corner components 34 and the wedge components 35 of the mandrels 17. The pattern 40 comprises a generally cubic base member 41 on which four parallel corner edges are bevelled, and a circularly cylindrical stem member 42 of relatively small diameter that extends axially from a center portion of one face of the base member 41 in a direction parallel to the bevelled corner edges thereof. The stem member 42 is secured to the base member 41 in a conventional manner: e.g., a screw-threaded proximal end portion of the stem member 42 is received in a matingly screw-threaded hole at the center portion of the face of the base member 41.

The pattern 40 further comprises a stack of substantially identical wafers 43 (preferably made of metal). Each of the wafers 43 is of square surface area with a central aperture that is larger (e.g., three times larger) than the diameter of the stem member 42. The wafers 43 are stacked on the base member 41 so that the stem member 42 passes through the central apertures of the wafers 43. A distal end of the stem member 42, which is likewise screw-threaded, extends beyond the stack of wafers 43 positioned on the base member 41. A washer 44 is fitted over the distal end of the stem member 42 so as to abut an uppermost one of the wafers 43, and a nut 45 is engagingly but loosely secured to the screw-threaded distal end of the stem member 42. The nut 45 is not "tightened" on the stem member 42, but is only loosely secured thereto so that the individual wafers 43 are free to move laterally (i.e., in a direction perpendicular to the stem member 42)—although longitudinal motion of the wafers 43 along the stem member 42 is precluded.

In FIG. 13, a jig is illustrated that can be used to position the individual wafers 43 of the pattern 40 laterally with respect to the stem member 42, so that the four elongate sides of the stack of wafers 43 thereby assume a sinuosity having a specified period and amplitude as required for a particular application. The jig comprises a base member 46, which is of generally square transverse cross-sectional configuration with orthogonally intersecting troughs cut into an upper surface thereof. The troughs are positioned to divide the upper surface of the base member 46 of the jig symmetrically into four equal quadrants. The troughs are cut to a depth substantially equal to the height of the cubic base member 41 of the pattern 40, and to a width that is slightly smaller than the width of the base member 41 of the pattern 40. Keys 47 project outward from (and extend along) sidewalls of the troughs.

The jig also comprises four die plates 48, which are dimensioned to abut corresponding sides of the pattern 40 (i.e., corresponding sides of the stack of wafers 43) after the base member 41 of the pattern 40 has been received at the intersection of the troughs on the upper surface of the base member 46 of the jig. Bevelling of the corner edges of the base member 41 of the pattern 40 facilitates mounting of the pattern 40 on the base member 46 of the jig at the intersection of the troughs. Each die plate 48 has a base portion and an upper portion. The base portion of each one of the die plate 48 is configured to slide into a corresponding one of the troughs on the base member 46 of the jig; and the upper portion of each die plate 48 is configured to abut a corresponding side of the stack of wafers 43.

Keyways are provided on the base portions of the die plates 48 to engage the keys 47 projecting outward from the sidewalls of the troughs on the base member 46 of the jig. Screws 49 extending through bores in the base portions of the die plates 48 are received in corresponding screw-threaded holes in respective sides of the base member 41 of the pattern 40 to secure the die plates 48 in place against the pattern 40. The upper portions of the die plates 48 abutting corresponding sides of the stack of wafers 43 of the pattern 40 are machined to have undulate surfaces of specified period and amplitude. The undulate surface of the upper portion of each die plate 48 is covered by a corresponding sheet 50 of flexible material such as polytetrafluoroethylene (marketed under the trademark Teflon). When the die plate 48 is secured to the base member 41 of the pattern 40, the sheet 50 is sandwiched between the undulate surface of the upper portion of the die plate 48 and the corresponding side of the stack of wafers 43. The function of the sheet 50 is described hereinafter.

In FIG. 14, the jig illustrated in FIG. 13 is shown after the die plates 48 have been secured to the base member 41 of the pattern 40. The stack of wafers 43 is not compressed downwardly by the "untightened" nut 45, and hence the individual wafers 43 in the stack are free to move laterally with respect to the stem member 42 to a maximum extent determined by the diameter of the the central apertures of the wafers 43. In the jig, the individual wafers 43 in the stack are moved laterally by different amounts as determined by the period and amplitude of the undulate surfaces of the die plates 48. After the stack of wafers 43 has assumed the predetermined surface sinuosity imparted by the die plates 48, the nut 45 is then "tightened" to cause the stack of wafers 43 to retain the same surface sinuosity when the pattern 40 is removed from the jig. To remove the pattern 40 from the jig, the screws 49 are withdrawn from the corresponding holes in the base member 41 of the pattern 40, and the die plates 48 are slid along the troughs on the base member 46 of the jig away from contact with the pattern 40. The pattern 40 is then lifted away from the jig.

In FIG. 15, the pattern 40 is shown with a specified surface sinuosity. The pattern 40 can be used in a conventional manner to form a mold made of a suitable heat-resisting material such as plaster, salt, a metal, or a plastic in which a metal (e.g., aluminum) can be cast to produce an elongate hollow structure of square cross-sectional configuration from which the die-plate components (viz., the four corner components 34 and the four wedge components 35) are cut. It is anticipated that the mold could also be formed from an exotic refractory material made of ultrapure fused silica fibers (i.e., the principal ingredient of the high-temperature insulating tiles used on NASA's space shuttle orbiters). Alternatively, the pattern 40 could be used as a templet for a computer-controlled milling machine to produce the elongate hollow structure from which the eight die-plate components are cut.

A jig assembly comprising different sets of die plates 48 could be used to fabricate patterns having correspondingly different surface sinuosities. Each particular set of die plates 48 of such a jig assembly would be used to form a correspondingly particular kind of pattern, whose surfaces would have a correspondingly particular sinuosity.

In FIG. 16, the stack of wafers 43 as configured on the jig by the undulate surfaces of the upper portions of the die plates 48 is shown in cross-sectional detail. The flexible Teflon sheets 50 that cover corresponding surfaces of the upper portions of the adjacent die plates 48 are illustrated with a somewhat exaggerated thickness. In practice, each of the flexible sheets 50 has a thickness equal to about one-half the thickness of the web formed between adjacent interstices on the loom 10. The function of the flexible sheets 50 is to accommodate the thickness of the web in determining appropriate dimensions for the pattern 40, which is to be used in fabricating the elongate hollow structure from which the die-plate components (i.e., the four corner components 34 and the four wedge components 35) of the mandrel 17 are cut.

The area of the sides of the pattern 40 determines the area of the undulate surfaces of the die-plate components (i.e., the area of the corner components 34 and of the wedge components 35) of the mandrel 17, which is fabricated in the mold that is made by using the pattern 40. In an application in which a number grid structures according to the present invention are to be stacked vertically one on top of another, portions of bottom ends of the intersecting grid sections of one grid structure must make overlapping contact with portions of top ends of the intersecting grid sections of another grid structure. The strength of the attachment of the overlapping end portions of the intersecting grid sections of the vertically stacked grid structures to each other depends to a considerable extent upon the area of contact between the overlapping end portions of the intersecting grid sections—i.e., upon the amount of "gripping surface" on the top and bottom end portions of the intersecting grid sections of the vertically stacked grid structures.

In FIG. 17, an enlarged cross-sectional view with exaggerated curvature is shown for an end portion (either top or bottom) of one of the intersecting grid sections of a grid structure that is to be vertically stacked with other similar grid structures. The end portion of the grid section as shown in FIG. 17 is compressed between corresponding die-plate components (i.e., corner components 34 and wedge components 35) of the laterally expanded mandrels 17 in adjacent interstices defined by the intersecting grid sections. The end portion of the grid section is seen to have stepwise surface discontinuities, which are produced by corresponding stepwise discontinuities on the surfaces of the die-plate components 34 and 35 pressing against the end portion of the grid section. Such stepwise surface discontinuities on the end portions of the grid sections facilitate interlocking of the bottom end portions of the intersecting grid sections of one grid structure with the top end portions of the intersecting grid sections of another grid structure when the grid structures are vertically stacked.

The stepwise discontinuities on surface portions of the die-plate components 34 and 35 of the mandrel 17 result from corresponding stepwise discontinuities on the surface of the pattern 40. In fabricating the pattern 40, the die plates 48 of the jig are pressed inwardly against the stack of wafers 43—as discussed above in connection with FIGS. 13, 14 and 15—so as to cause the individual wafers 43 in the stack to move laterally by different amounts. The sides of the stack of wafers 43 are thereby caused to conform generally to the sinuosity of the surfaces of the die plates 48 of the jig, and a stepwise wafer-to-wafer discontinuity along each side of the stack of wafers 43 is superimposed on the sinuosity produced by the die plates 48.

The stepwise wafer-to-wafer discontinuities on the sides of the pattern 40 can subsequently be eliminated on any particular portion (e.g., a central portion) of the pattern 40 by grinding and polishing. However, where it is advantageous to provide stepwise discontinuities on the die-plate components 34 and 35 of the mandrel 17 (e.g., near the top and/or near the bottom), the wafer-to-wafer discontinuities on corresponding portions of the pattern 40 (i.e., surface portions adjacent the top and bottom ends of the stack of wafers 43 of the pattern 40) are retained. Retention of the stepwise wafer-to-wafer discontinuity on the sides of the pattern 40 in the vicinity of the top and bottom ends of the stack of wafers 43, which results in the formation of stepwise discontinuities adjacent the top and bottom ends of the undulate surfaces of the die-plate components of the mandrels 17, causes maximization of the total surface area (i.e., the "gripping surface") on the overlapping end portions of the intersecting grid sections of the vertically stacked grid structures.

FIG. 18 provides a perspective view of the expander bolt 37 and the hollow structure of a representative one of the mandrels 17. The expander bolt 37 is shown in exploded detail to comprise a square top piece 51 and various internal components, as described hereinafter. The hollow structure comprises the eight die-plate components (i.e., the four corner components 34 and the four wedge components 35), which are held together by the spring clips 36 and 36'.

The illustration in FIG. 18 is such that the perspective of the internal components of the expander bolt 37 is rotated by 45 degrees from the perspective of the top piece 51 and the perspective of the components of the hollow structure comprising the die-plate components of the mandrel 17. The different perspectives for the internal components of the expander bolt 37 on the one hand, and for the top piece 51 and the components of the hollow structure on the other hand, are deemed to show particular the features of the expander bolt 37 and the hollow structure to best advantage.

The square top piece 51 of the expander bolt 37 is dimensioned so that, when the wedge components 35 of the hollow structure have been forced laterally outward (i.e., "expanded") to the fullest extent—i.e., when the undulate surfaces of the wedge components 35 are flush with the undulate surfaces of the adjacent corner components 34, a peripheral underside portion of the top piece 51 then rests on an upper-end surface of the hollow structure. The top piece 51 is secured by means of machine screws 52 to an elongate first cam piece 53, which projects perpendicularly downward from a central underside portion of the top piece 51. A central aperture in the top piece 51 is dimensioned to accommodate a screw-threaded end of a bolt 54, which extends therethrough so as to be received in a matingly screw-threaded bore on a top surface of the first cam piece 53. A locknut 55 on the bolt 54 maintains a head portion of the bolt 54 at a predetermined height above the top piece 51, so that corresponding head portions of all the bolts 54 on all of the mandrels 17 simultaneously make contact with an underside of the top pressure plate 14 when the top pressure plate 14 has been lowered (as described hereinafter) to assume the position illustrated in FIG. 2.

Guide plates 56 are secured (as by machine screws) to opposite sides of an upper portion of the first cam piece 53, and project downward so as to maintain the first cam piece 53 in longitudinal orientation with respect to the die-plate components of the mandrel 17. The first cam piece 53 has a tongue portion 57, which fits longitudinally within a channel formed by parallel guide walls on a first cam follower 58. The parallel guide walls on the first cam follower 58 are received within corresponding gaps between the tongue portion 57 of the first cam piece 53 and the guide plates 56 projecting downward on either side thereof. A first cam surface 59 on the tongue portion 57 of the first cam piece 53 is dimensioned to bear against a corresponding cam surface 60 on the first cam follower 58. Thus, a force with an outwardly directed lateral component is exerted on the first cam follower 58 when the first cam piece 53 is pressed downward by the top pressure plate 14 so as to convert the mandrel 17 to the "tightened" configuration.

A slot 61 on the tongue portion 57 of the first cam piece 53 intercrosses parallel slots 62 on the parallel guide walls on the first cam follower 58. A pin 63 with a locking ring 64 extends through the slots 61 and 62 to connect the first cam piece 53 to the first cam follower 58. A transversely extending bore 65 through the first cam follower 58 is dimensioned to receive a first hooked end of a tension spring 66. A longitudinal groove 67 on an outwardly facing surface of the first cam follower 58 extends on both sides of the bore 65, and is dimensioned to receive a pin 68 lengthwise therein. The pin 68 passes through the first hooked end of the spring 66 to connect the spring 66 to the first cam follower 58.

A second hooked end of the tension spring 66 is similarly connected to a second cam follower 69. A second cam surface 70 on the tongue portion 57 of the first cam piece 53 is dimensioned to bear against a corresponding cam surface 71 on the second cam follower 69. Thus, when the first cam piece 53 is pressed downward by the top pressure plate 14 so as to convert the mandrel 17 to the "tightened" configuration, a force is thereby also exerted on the second cam follower 69 at the same time that the aforementioned force is exerted on the first cam follower 58. Lateral components of the forces exerted on the first and second cam followers 58 and 69 are directed outwardly in opposite directions. The second hooked end of the spring 66 is received in a transversely extending bore 72 through the second cam follower 69. A longitudinal groove on an outwardly facing surface of the second cam follower 69 extends on both sides of the bore 72, and is dimensioned to receive a pin 73 lengthwise therein. The pin 73 passes through the second hooked end of the spring 66 to connect the spring 66 to the second cam follower 69.

A second cam piece 74 is connected to the second cam follower 69 in generally the same way that the first cam piece 53 is connected to the first cam follower 58. Thus, a tongue portion 75 of the second cam piece 74 is dimensioned to fit longitudinally within a channel formed by parallel guide walls on the second cam follower 69. Cam surfaces 76 and 77 on the tongue portion 75 of the second cam piece 74 bear against corresponding cam surfaces on the first and second cam followers 58 and 69, respectively. A slot 78 on the tongue portion 75 of the second cam piece 74 intercrosses parallel slots 79 on the parallel guide walls on the second cam follower 69. A pin 80 with a locking ring 81 extends through the slots 78 and 79 to connect the second cam piece 74 to the second cam follower 69. A bottom end portion 82 of the second cam piece 74 is of square transverse cross section, and is dimensioned to be received within the corresponding opening on the floor plate 16 when the mandrel 17 is inserted into the corresponding interstice defined by the intersecting grid sections.

A first folded bulkhead 83 is secured to the outwardly facing surface of the first cam follower 58 by machine screws 84 so as to cover the groove 67 and thereby confine the pin 68 therein. A second folded bulkhead 85 is secured to the outwardly facing surface of the second cam follower 69 by machine screws 86 so as to cover the groove in which the pin 73 is received.

In FIG. 19, a representative one of the mandrels 17 is shown in "relaxed" configuration within the corresponding interstice defined by the intersecting grid sections. The second cam piece 74 is rigidly positioned on the floor plate 16 because of the tight fit of the bottom end portion 82 thereof within the corresponding opening on the floor plate 16. When the top pressure plate 14 is lowered so as to press the first cam piece 53 downward, the first and second cam followers 58 and 69 are concomitantly moved laterally outward in opposite directions (i.e., "expanded")—as indicated by the arrows in FIG. 19—as the cam surfaces 59 and 70 on the tongue portion 57 of the first cam piece 53 slide along the contacting cam surfaces 60 and 71 of the first and second cam followers 58 and 69, respectively, and as the other cam surfaces of the first and second cam followers 58 and 69 slide along the corresponding contacting cam surfaces 76 and 77, respectively, on the tongue portion 75 of the second cam piece 74.

In FIG. 20, the mandrel 17 is shown in "tightened" configuration, which occurs when a peripheral underside portion of the top piece 51 bears against the upper-end surface of the hollow structure comprising the die-plate components of the mandrel 17. The head portion of the bolt 54 is maintained by the locknut 55 at just the right height above the top piece 51 so that the peripheral underside portion of the top piece 51 makes contact with the upper-end surface of the hollow structure precisely when the top pressure plate 14 (after making contact with the head portion of the the bolt 54) has been lowered to a predetermined position (i.e., the "closed" position) as illustrated in FIG. 2.

The heights of the head portions of all the bolts 54 above the corresponding top pieces 51 of the expander bolts 37 in all the corresponding interstices formed by the intersecting grid sections on the loom 10 are adjusted so that the peripheral underside portions of all the top pieces 51 make contact with the upper-end surfaces of the hollow structures comprising the die-plate components of all the corresponding mandrels 17 when the top pressure plate 14 has been lowered to the "closed" position. Gaskets 87 made of silicon rubber are pressed into grooves extending along the peripheral underside portions of the top pieces 51. The gaskets 87 form seals between the peripheral underside portions of the top pieces 51 and the upper-end surfaces of the hollow structures comprising the die-plate components of the corresponding mandrels 17. These seals inhibit passage of liquid resin into the interior of the hollow segmented mandrels 17.

In FIG. 21, the mandrel 17 is shown in a configuration approximately midway between the "relaxed" configuration illustrated in FIG. 19 and the "tightened" configuration illustrated in FIG. 20. As the first cam piece 53 is pressed downward by the top pressure plate 14, the first and second cam followers 58 and 69 are concomitantly moved laterally outward (i.e., "expanded"). The spring clips 36 and 36' at the top and bottom ends, respectively, of the hollow structure formed by the die-plate components (i.e., by the four corner components 34 and the four wedge components 35) of the mandrel 17 are thereby stretched. The spring clips 36 and 36' are of generally the same shape; but the top spring clip 36 is thicker and has greater temper strength than the bottom spring clip 36'. Consequently, the top spring clip 36 has a greater spring tension than the bottom spring clip 36'. Because of the difference in spring tension between the spring clips 36 and 36', there is a short time lag between full outward expansion of the bottom ends (which occurs first) and full outward expansion of the top ends (which occurs later) of the cam followers 58 and 69. Sequential outward expansion of the cam followers 58 and 69 from bottom to top causes a concomitant sequential outward expansion from bottom to top of the die-plate components that form the hollow structure of the mandrel 17.

FIG. 22 shows a transverse cross-sectional view of the mandrel 17 approximately at the plane of the top spring clip 36 at a time before the top ends of the cam followers 58 and 69 have been expanded laterally outward. It is apparent in FIG. 22 that each of the folded bulkheads 83 and 85 (which are attached to the cam followers 58 and 69, respectively) presents an outwardly facing surface that is folded so as to define three planar sectors, viz., a middle sector and two end sectors. The two end sectors of each of the folded bulkheads 83 and 85 are angled with respect to the middle sector thereof, and abut the inwardly facing planar surfaces of adjacent wedge components 35 of the hollow structure of the mandrel 17. When outward expansion of the cam followers 58 and 69 is initiated by the lowering of the top pressure plate 14, the angled end sectors of the folded bulkheads 83 and 85 thereby apply outwardly directed forces to the wedge components 35 against oppositely directed restraining forces exerted by the spring clip 36. As the outwardly directed forces overcome the restraining forces exerted by the spring clip 36, the middle sectors of the folded bulkheads 83 and 85 eventually come into contact with the inwardly facing planar sides of corresponding corner components 34 in diagonally opposite corners of the hollow structure.

In FIG. 23, a transverse cross-sectional view of the mandrel 17 approximately at the plane of the bottom spring clip 36' is shown at a time after the bottom ends of the cam followers 58 and 69 have been expanded laterally outward to the fullest extent. As shown in FIG. 23, the end sectors of the folded bulkheads 83 and 85 attached to the cam followers 58 and 69, respectively, have forced the wedge components 35 of the hollow structure of the mandrel 17 laterally outward so that the inwardly facing planar surfaces of the wedge components 35 are flush with the inwardly facing planar surfaces of the adjacent corner components 34. When outward expansion of the cam followers 58 and 69 has reached the fullest extent, the middle sectors of the folded bulkheads 83 and 85 are then in contact with the inwardly facing planar sides of corresponding corner components 34 in diagonally opposite corners of the hollow structure. Because of the difference in spring tension between the spring clips 36 and 36', outward expansion of the cam followers 58 and 69 to the fullest extent occurs at the bottom of the interstice (as illustrated in FIG. 23) before it occurs at the top of the interstice (as illustrated in FIG. 22).

Outward expansion sequentially from bottom to top of the cam followers 58 and 69 causes a concomitant outward expansion sequentially from bottom to top of the die-plate components (i.e., the corner components 34 and the wedge components 35) forming the hollow structure of the mandrel 17 against which the folded bulkheads 83 and 85 press. The outwardly facing sides of the die-plate components are undulate. Thus, outward expansion sequentially from bottom to top of the die-plate components causes the undulate sides thereof to make contact sequentially from bottom to top with the adjacent webs consisting of the fibrous material of the cocoons 33 and the fibrous material of the intersecting grid sections.

Each of the four undulate sides of the hollow structure formed by the die-plate components of each mandrel 17 has a surface area that is substantially equal to the planar surface area of the portion of the web of filamentary fibers adjacent thereto. Since contact between the undulate sides of the hollow structure (i.e., the die-plate components) of the mandrel 17 and the portions of the webs adjacent thereto occurs sequentially from bottom to top over an interval of time, the webs are drawn gradually downward at a controlled rate as the contact is being made. The webs of filamentary fibers thereby cover the undulate surfaces of the hollow structure substantially uniformly. If the undulate sides of the hollow structure of the mandrel 17 were to be pressed against all is portions of the adjacent webs from bottom to top simultaneously (i.e., if there were no time lag from bottom to top in making contact between the undulate sides of the die-plate components of the mandrel 17 and the adjacent portions of the webs), a stretching of the web could result that might rupture or otherwise weaken the filamentary fibers and thereby damage the grid section.

In FIG. 24, the loom 10 is shown with the intersecting planar grid sections formed thereon. The four comb plates 15 are shown fastened to the tubular columns 19, which are fastened by the screws 20 to the floor plate 12 positioned in the central aperture of the base member 11. After the comb plates 15 have been thusly secured to the floor plate 11, the cocoons 33 made of filamentary fibers are then installed in the corresponding interstices formed by the intersecting planar grid sections.

FIG. 25 depicts a commercially obtainable sheet of graphite fibers impregnated with uncured epoxy resin (i.e., a product called a "prepreg" sheet), which is used to form a representative one of the cocoons 33 according to a preferred embodiment of the present invention. The graphite fibers comprising the "prepreg" sheet extend generally in a single direction. The particular type of "prepreg" sheet shown in FIG. 25 has stitching (likewise made of graphite fibrous material), which extends in a direction generally orthogonal to the direction of the graphite fibers of the cocoon 33. The stitching serves to prevent bunching of the graphite fibers at locations away from the edges of the cocoon 33 when the die-plate components of the mandrels 17 in adjacent interstices are expanded laterally so as to draw the webs downward. In an alternative embodiment in which the "prepreg" sheet forming the cocoon 33 is arranged so that the graphite fibers of the cocoon 33 extend diagonally within the interstice, such stitching would not be necessary because a downward pull on one end of each of the diagonally extending fibers would effectively pull the entire fibers and thereby prevent bunching of the fibers at locations away from the edges of the cocoon 33.

To form each cocoon 33 from a corresponding one of the "prepreg" sheets, two opposite edges of the "prepreg" sheet are made to overlap each other; and the overlapping edges are adhesively joined (as by application of a dab of epoxy resin) to give the "prepreg" sheet a hollow cylindrical configuration. Manufacturers of "prepreg" sheets can readily fabricate the cocoon 33 (sometimes called "socks") to specified dimensions. The "prepreg" sheets are non-rigid; and hence each of the cocoons 33 formed therefrom have can be flexibly configured as illustrated in FIG. 26. Non-rigidity of each cocoon 33 facilitates insertion thereof into the corresponding interstice formed by the intersecting planar grid sections. As indicated in FIG. 26, the graphite fibers of the "prepreg" sheet extend generally longitudinally with respect to the cylindrical axis of the cocoon 33 formed therefrom. The stitching on the "prepreg" sheet extends transversely with respect to the cylindrical axis of the cocoon 33.

FIGS. 27, 28 and 29 illustrate tools that can be used to install the cocoons 33 in the corresponding interstices defined by the intersecting planar grid sections formed on the loom 10. The tool shown in FIG. 27 is a four-sided anvil 88, which has a metal upper portion of hollow cylindrical configuration with a square transverse cross section, and a metal bottom portion (which can also be hollow) with a square transverse cross section that is narrower than the upper portion. The upper portion of the anvil 88 comprises four side panels, which are dimensioned to abut corresponding portions of four adjacent planar grid sections when the anvil 88 has been inserted into the interstice that is defined by the four adjacent grid sections. A crossbar 89 extending between two opposite side panels of the anvil 88 can be grasped to facilitate placement of the anvil 88 within the corresponding interstice. The bottom portion of the anvil 88 is configured and dimensioned like the bottom end portion of the expander bolt 37 of each of the mandrels 17 so as to be receivable within a corresponding opening on the floor plate 16.

To install one of the cocoons 33 in a corresponding one of the interstices defined by the intersecting planar grid sections, four anvils 88 are first inserted into corresponding interstices adjacent the four sides of the interstice in which the cocoon 33 is to be installed. However, if the interstice in which the cocoon 33 is to be installed is an "outer" interstice (i.e., an interstice located next to a portion of a grid section that forms a side of the grid structure), there is no interstice adjacent one of the sides (viz., the outer side) of that "outer" interstice. If the interstice in which the cocoon 33 is to be installed is located next to portions of grid sections that form a corner of the grid structure, there are no interstices adjacent two outer sides of that interstice. However, there is a gap between each grid section forming an outer side of the grid structure and the adjacent comb plate 15. Anvil plates 90 as illustrated in FIG. 28, rather than four-sided anvils 88 as shown in FIG. 27, are inserted into such gaps. The anvils 88, and the anvil plate (or plates) 90 when used, provide rigid backing for the portions of the grid sections that define the interstice in which the cocoon 33 is to be installed.

In FIG. 29, a spreading tool 91 is illustrated, which is used to open (i.e., to "spread") the cocoon 33 in the corresponding interstice so that the cocoon 33 can assume the configuration of a cylinder of square transverse cross section. The spreading tool 91 causes the four sides of the opened square-cylindrical cocoon 33 to abut corresponding portions of the four grid sections that define the interstice. If the interstice in which the cocoon 33 is to be opened is an "inner" interstice, the portions of all the grid sections defining the interstice are backed by corresponding side panels of the anvils 88 positioned in the four adjacent interstices. If the interstice in which the cocoon 33 is to be opened is an "outer" interstice, the portions of one or two of the grid sections defining the interstice are backed by a corresponding one or two of the anvil plates 90. After the anvils 88, and the anvil plate or plates 90 (if used), have been inserted into the adjacent interstices and gap or gaps, the cocoon 33 is then inserted in folded configuration (as indicated in FIG. 26) longitudinally into the corresponding interstice. The spreading tool 91 is then inserted longitudinally into the cocoon 33.

FIG. 30 shows four anvils 88 positioned in corresponding interstices on four sides of an interstice into which one of the cocoons 33 is to be inserted. FIG. 30 also shows another four anvils 88 positioned in corresponding interstices on four sides of another interstice in which another one of the cocoons 33 has already been inserted, and further shows a corresponding one of the spreading tools 91 in position inside the cocoon 33 within the interstice. Details of the spreading tool 91 are illustrated in FIGS. 31 and 32.

The spreading tool 91 somewhat resembles the mandrel 17 in design. Thus, the spreading tool 91 comprises an elongate hollow structure consisting of a set of four corner components 92 and a set of four wedge components 93, all of which are held together by a pair of spring clips (not visible in the cross sections of FIGS. 31 and 32). The spreading tool 91 further comprises an expander bolt (generally identical to the expander bolt 37 illustrated in FIG. 18), which is is inserted longitudinally into the hollow structure formed by the corner components 92 and the wedge components 93.

Each of the corner components 92 of the spreading tool 91 is of generally triangular prismatic configuration; and each of the wedge components 93 thereof is of modified trapezoidal configuration. However, unlike the die-plate components of the mandrels 17, all sides of the corner components 92 and wedge components 93 of the spreading tool 91 are planar. An apical ridge is formed on each of the corner components 92 by the intersection of two sides thereof at an angle of less than 90 degrees. Two non-parallel sides of each of the wedge components 93 are angled (e.g., at 45 degrees) so as to make sliding contact with a third side of each of two adjacent corner components 92. The expander bolt positioned longitudinally within the hollow structure formed by the corner components 92 and the wedge components 93 is activated (i.e., "expanded") to convert the spreading tool 91 from a "relaxed" configuration in which the corner components 92 are spaced apart from the intersecting planar grid sections forming the interstice to a "tightened" configuration in which the corner components 92 press adjacent portions of the cocoon 33 into contact with corresponding portions of the grid sections at the corners of the interstice.

In FIG. 31, the spreading tool 91 in a representative interstice formed by the intersecting planar grid sections is shown in "relaxed" configuration in which the cocoon 33 around the spreading tool 91 fits loosely within the interstice, and does not make compressive contact with the adjacent grid sections. In FIG. 32, the spreading tool 91 is shown in the same interstice in "tightened" configuration. When the spreading tool 91 is in "tightened" configuration, folded bulkheads 94 and 95 (which function in substantially the same manner as the folded bulkheads 83 and 85 of the expander bolt 37 illustrated in FIG. 18) exert outwardly directed forces on the wedge components 93. The wedge components 93 thereupon exert forces on the corner components 92, which cause the apical ridges on the corner components 92 (and hence also the corners of the cocoon 33 around the spreading tool 91) to be pressed tightly into the corners of the interstice. The epoxy resin impregnating the fibers of the cocoon 33 (even though still uncured) causes the cocoon 33 to adhere to the grid sections at the corners of the interstice, so that the cocoon 33 assumes the square cylindrical configuration of the interstice.

After the cocoons 33 have been installed in the corresponding interstices, the mandrels 17 are then inserted into the cocoons 33. Compressive forces, as mentioned above, will subsequently be applied (as described hereinafter) to the cocoons 33 and to the adjacent grid sections in order to form the webs that are eventually to become the grid sections of the grid structure. An additional amount of epoxy resin will then be applied to the webs by a vacuum process, as described hereinafter, in order to saturate the webs with matrix material. Finally, a heating process will be used to cure the epoxy resin so as to produce the grid structure. However, in anticipation of certain debris-generating consequences of the vacuum and heating processes, it is expedient to enclose the mandrels 17 in loosely fitting heat-resistant wrappings before the mandrels 17 are inserted into the cocoons 33. The heat-resistant wrappings protect the mechanisms of the mandrels 17 (particularly the mechanisms of the expander bolts 37) from clogging and sticking, and hence facilitate removal, cleaning and subsequent re-use of the mandrels 17.

In FIG. 33, the loom 10 is shown with the intersecting planar grid sections formed thereon as in FIG. 24, and additionally with the mandrels 17 inserted into the corresponding interstices formed by the intersecting grid sections. Each of the mandrels 17 is enclosed in a corresponding sack 96, which can be a heat-resistant wrapping such as a commercially available oven cooking bag marketed by Reynolds Metal Company. The sack 96 is sized to enclose the mandrel 17 completely, and is loosely closed by means of a cinch 97 made of the same tough heat-resistant material as the sack 96.

In FIG. 34, downwardly directed arrows indicate longitudinally directed forces being applied to the head portions of the bolts 54 of the mandrels 17 by downward motion of the top pressure plate 14—so as to cause laterally outward expansion of the expander blots 37 as described above. Also shown in FIG. 34 are arrows indicating laterally directed forces being applied to the comb plates 15 by inward motion of the sliding members 26. These forces cause the fibrous material of the cocoons 33 and the fibrous material of the adjacent grid sections to be compressed together between the die-plate components (i.e., the corner components 34 and the wedge components 35) of the mandrels 17 in adjacent interstices.

The top pressure plate 14 is pressed downward upon the head portions of the bolts 54 by a conventional means such as a hydraulic ram 98. As indicated in FIG. 34, the ram 98 includes a piston 99, which is dimensioned so that a distal end thereof can be received within a matingly configured socket 100 that is attached (as by brazing) to a central topside surface portion of the top pressure plate 14. The distal end of the piston 99 is secured within the socket 100 by means of a removable pin 101, which extends transversely through diametrically aligned holes on the piston 99 and on the socket 100. The ram 98 is mounted on a movable arm 102, which can be maneuvered to align the top pressure plate 14 with the opening at the top of the box formed by the four comb plates 15 and the floor plate 16—so that the horizontal top pressure plate 14 can fit within the confines of the four vertical comb plates 15.

When the top pressure plate 14 is in position in the opening bounded by the four comb plates 15, the quick-release pins 21 are then inserted through holes near the upper edges of the comb plates 15 into bores that are aligned therewith in the edges of the top pressure plate 14—thereby locking the comb plates 15 to the top pressure plate 14. After the quick-release pins 21 have been inserted so as to lock the comb plates 15 to the top pressure plate 14, downward pressure is then applied by the ram 98 to the top pressure plate 14 so as to press bottom edges of the comb plates 15 into corresponding grooves adjacent the periphery of the floor plate 16—as illustrated in FIG. 36 (discussed hereinafter). While downward pressure is being applied to the top pressure plate 14, the screws 20 in the tubular columns 19 are further tightened so as to secure the comb plates 15 to the floor plate 16—thereby completing the box defined by the four comb plates 15, the floor plate 16 and the top pressure plate 14, which encloses the working volume. The top pressure plate 14 has an opening covered by a hatch 103 through which additional epoxy resin is applied to the webs formed by the fibrous material of the cocoons 33 and the adjacent grid sections.

Also attached to the topside surface of the top pressure plate 14 (as by brazing) are a pair of support members 104 upon which corresponding pressure bars 105 are adjustably mounted (as by screws) so as to project vertically downward by a predetermined amount from two opposite sides of the top pressure plate 14. The pressure bars 105 are configured so as to press downward upon top surfaces of some of the posts 13 (which are secured to the frame member 12 and extend upward through corresponding "post hole" apertures in the base member 11), when the top pressure plate 14 has been lowered so as to press downward upon the head portions of the bolts 54. As shown in FIG. 34, the pressure bar 105 attached to the support member 104 on one side of the top pressure plate 14 presses downward upon the posts $13k$ and $13m$, and the other pressure bar 105 attached to the other support member 104 on the opposite side of the top pressure plate 14 presses downward upon the posts $13l$ and $13n$ (which are not visible in the perspective of FIG. 34).

As indicated by arrows in FIG. 35, downward pressure on the posts $13k$, $13l$, $13m$, and $13n$ causes the compression-spring mountings 24 to undergo compression, which results in a lowering of the frame member 12. As the frame member 12 and the posts 13 secured thereto are lowered, a concomitant lowering of the webs formed by the fibrous material of the cocoons 33 and the adjacent grid sections occurs. The lowering of the webs under pressure serves to feed the webs at a substantially uniform rate into corresponding gaps between the die-plate components of mandrels 17 in adjacent interstices as the gaps close sequentially from bottom to top. The feeding of the webs into the gaps between the die-plate components of mandrels 17 at a substantially uniform rate produces substantially uniform grid sections defining the interstices of the grid structure that is to be fabricated.

FIG. 35 also indicates the direction of forces acting on the webs that are formed between the mandrels 17 from the fibrous material of the cocoons 33 and the adjacent grid sections. Laterally directed forces exerted inwardly by the pressure pads 28 of the sliding members 26 on all four of the comb plates 15 are applied at the same time that laterally directed forces are exerted outwardly by the mandrels 17 in each of the interstices on the webs between adjacent mandrels 17. The net result is compression of the webs between adjacent mandrels 17.

FIG. 36 shows a detail of the bottom edge of each of the four comb plates 15, which serve as the four side walls of the working volume in which the grid structure is to be fabricated. A detent at the bottom edge of the outwardly facing surface of each comb plate 15 locks the comb plate 15 in the groove adjacent the periphery of the floor plate 16. Each comb plate 15, and also the die-plate components of the mandrels 17 (as represented by the wedge components 35 in FIG. 36) in the interstices adjacent thereto (i.e., in the "outer" interstices on the side of the grid structure bounded by the comb plate 15), are pressed into the gasket 38 in the groove adjacent the periphery of the floor plate 16. The web consisting of the fibrous material of the "outer" grid sections adjacent the comb plate 15 and the fibrous material of the portions of the cocoons 33 in the "outer" interstices is compressed between the comb plate 15 and the die-plate components of the mandrels 17.

After the top pressure plate 14 has been lowered and the four comb plates 15 have been move inwardly so that the webs are in compression within the working volume, the portions of the grid sections in the vicinity of the posts 13—i.e., the portions of the grid sections outside the box whose side walls are formed by the comb plates 15—are cut away as illustrated in FIG. 37. Dangling fibrous threads, which result when the portions of the grid sections in the vicinity of the posts 13 are cut away, are then tucked into the gaps between the tooth portions of the comb plates 15 as illustrated in FIG. 38. Then, as indicated in FIG. 39, the sliding members 26 (and the attached adjustment members 27) of the abutment devices 23 are removed from the base member 11; and the pressure bars 105 are removed from the support members 104 on the top pressure plate 14. The pin 101 is then removed from the diametrically aligned holes on the piston 99 and the socket 100, so that the piston 99 can be removed from the socket 100.

A ring fitting 106 is then secured to the socket 100 in place of the piston 99. As illustrated in FIG. 39, the ring fitting 106 has an end portion that is configured to be received within the socket 100, and a ring portion that extends outside the socket 100. The pin 101 is re-inserted transversely through diametrically aligned holes on the end portion of the ring fitting 106 and on the socket 100 to secure the ring fitting 106 to the socket 100. A hook 107 on the end of a cable 108 is then fitted through the ring portion of the ring fitting 106. The cable 108 is then drawn up in a conventional manner (as by a winch) in order to lift the enclosed box defined by the four comb plates 15 (as side walls), the floor plate 16 (as the bottom) and the top pressure plate 14 (as the top) away from the loom 10. This box, which encloses the working volume in which the grid structure is to be fabricated, is then placed on a suitable work surface where the cover plates 22 can be secured to the comb plates 15. The hook 107 is then removed from the ring portion of the ring fitting 106, and the pin 101 and the ring fitting 106 are removed from the socket 100.

When the comb plates 15 are clear of the posts 13 on the loom 10, the cover plates 22 are secured by screws 109 to the comb plates 15. The cover plates 22 provide a seal whereby epoxy resin is prevented from passing out of the box enclosing the working volume via the gaps between adjacent tooth portions of the comb plates 15. After the cover plates 22 are secured in place against the comb plates 15, additional epoxy resin, if needed, can be poured into the working volume through the opening in the top pressure plate 14 covered by the hatch 103. The webs (which consist of the fibrous material of the cocoons 33 and the fibrous material of the intersecting grid sections) within the working volume are then subjected to a vacuum treatment to provide substantially uniform saturation of the fibrous webs with epoxy resin, and to a heat treatment to cure the epoxy resin.

FIG. 40 illustrates a conventional technique for introducing additional epoxy resin into the working volume, and also for applying vacuum and heat to the resin-saturated fibrous webs within the working volume. The box enclosing the working volume is wrapped in a resin-absorbing blanket 110, which serves to absorb any excess epoxy resin that might leak out of the working volume during the application of vacuum and/or heat. (The resin-absorbing blanket 110 could be made of a material marketed by Air-Tek Corporation under the trademark "Air Weave N10".) The blanket-wrapped box enclosing the working volume is conveyed in a conventional manner into an oven 111, which also functions as a vacuum chamber. The oven 111 is evacuated in a conventional manner to form a vacuum therein, which causes the epoxy resin to diffuse substantially uniformly throughout the fibrous material comprising the webs formed within the working volume. Evacuation of the oven 111 also causes air bubbles to be drawn out of the webs and out of the epoxy resin. The resin-saturated fibrous webs are then heat-treated. After the heat treatment in the oven 111 has been completed and a suitable length of time has elapsed to ensure proper curing of the epoxy resin, the components of the box enclosing the working volume are then disassembled.

FIG. 41 illustrates disassembly of the components of the box enclosing the working volume. To detach the top pressure plate 14 from the comb plates 15, a slight downward pressure is exerted on the top pressure plate 14 to facilitate removal of the quick-release pins 21. After the quick-release pins 21 have been removed, the top pressure plate 14 slowly rises as the mandrels 17 return to the "relaxed" configuration. The top pressure plate 14 is then lifted away from the working volume. Then, the cover plates 22 are detached from the comb plates 15 by removal of the screws 109; the comb plates 15 are detached from the tubular columns 19 by removal of the screws through the holes in the tabs 18 extending outward therefrom; and the tubular columns 19 are detached from the floor plate 16 by removal of the screws 20. With removal of the top pressure plate 14, the top pieces 51 of the mandrels 17 extend upward out of the interstices of the grid structure formed by the intersecting grid sections. The mandrels 17 are then individually lifted out of the interstices by the top pieces 51.

FIG. 42 shows how a number of individual grid structures according to the present invention can be combined to form a larger structural assembly—which could be, e.g., a generally planar assembly of individual grid structures bonded together side-by-side, or a columnar assembly of individual grid structures stacked one on top of another, or a more complex assembly consisting of grid structures bonded together side-by-side together with grid structures stacked one on top of another. As shown in FIG. 42, slots 112 are provided on bottom edges of all the intersecting grid sections defining the interstices of each grid structure. The portions of the bottom edges of the intersecting grid sections between the slots 112 on any one grid structure function as "locking tabs", which can be inserted between orthogonally oriented grid sections at the top of any other grid structure so as to overlap corresponding portions of the top edges of the intersecting grid sections thereof. In effect, the slots 112 enable the bottom of any one grid structure to be "snapped" onto the top of any other grid structure so as to enable a columnar assembly to be constructed. An enlarged view of a portion of the bottom edge of an "outer" grid section of one of the individual grid structures of FIG. 42 is illustrated in FIG. 43 showing one of the slots 112.

Two levels of interlocking can be utilized in securing adjacent grid structures together to form a larger structural assembly. First, on a gross level, the interlocking that is provided by "locking tabs" as illustrated in FIGS. 42 and 43 can be utilized; and second, on a fine level, the interlocking that is provided by the mating of stepwise surface discontinuities as illustrated in FIG. 17 can be utilized.

In the embodiment of a grid structure according to the present invention as described above, the undulate surfaces of the intersecting grid sections that define the interstices of the grid structure all have the same sinuosity. However, for certain applications it might be advantageous to fabricate a grid structure in which the undulate surfaces of different intersecting grid sections have correspondingly different sinuosities.

In FIG. 44, an alternative embodiment of a grid structure according to the present invention is illustrated in which the sinuosities of the undulate surfaces of the intersecting grid sections differ in amplitude. Thus, as illustrated in FIG. 44, the sinuosities of the intersecting grid sections vary from a substantially zero sinuosity (i.e., a planar surface configuration) for grid sections defining a central interstice of the grid structure, through sinuosities of increasingly greater amplitude for grid sections defining interstices away from the central interstice, to a sinuosity having a specified maximum amplitude for the "outer" grid sections that form the sides of the grid structure. In other alternative embodiments, the frequency (i.e., the pitch) of the sinuosities of the undulate surfaces of the intersecting grid sections—instead of (or as well as) the amplitude of the sinuosities—could differ from grid section to grid section according to some specified pattern. To produce undulate grid sections having desired surface sinuosities, it is only necessary to use appropriately configured die-plate components (i.e., corner components 34 and wedge components 35) of the mandrels 17 in accordance with the fabrication technique described above.

FIG. 45 illustrates a conceptualized pontoon bridge comprising an assemblage of interlocking grid structures according to the present invention. In such a pontoon bridge, the interstices of the assembled grid structures would be packed with a light-weight buoyant material such as a polystyrene plastic (e.g., Styrofoam), and the packed grid structures would be covered with a water-tight thermoplastic material to seal the buoyant material within the interstices.

In FIG. 46, a conceptualized extraterrestrial space structure of large dimensions is illustrated, which comprises an assemblage of interlocking grid structures according to the present invention. Such a large space structure could be assembled on an orbiting space platform from compactly bundled packages of grid structures transported to the space platform by a conventional space shuttle.

The present invention has been described above in terms of particular embodiments. However, other embodiments within the scope of the invention would become apparent to practitioners skilled in the art upon perusal of the foregoing specification and accompanying drawing. Accordingly, the invention is defined more generally by the following claims and their equivalents.

I claim:

1. A method of fabricating a grid structure having sinuous interstices defined by intersecting grid sections, said intersecting grid sections having specified undulate surfaces, said method comprising:
   a) arranging filamentary material according to a predetermined pattern to form generally planar intersecting grid sections;
   b) inserting cocoons made of filamentary material into corresponding interstices defined by said generally planar intersecting grid sections, the filamentary material of said cocoons in said interstices extending transversely with respect to the filamentary material that is arranged to form said generally planar intersecting grid sections;
   c) inserting expandable mandrels into corresponding cocoons, said mandrels having undulate surfaces conforming generally to the undulate surfaces specified for the intersecting grid sections of the grid structure that is to be fabricated;
   d) expanding said mandrels within said corresponding cocoons so as to compress the filamentary material of said cocoons together with the filamentary material arranged to form said generally planar intersecting grid sections, said mandrels when expanded thereby converting said compressed filamentary material into intersecting grid sections with undulate surfaces, the undulate surfaces of said intersecting grid sections conforming generally to the undulate surfaces specified for the intersecting grid sections of the grid structure that is to be fabricated;
   e) causing said compressed filamentary material that has been converted into said intersecting grid sections with undulate surfaces to be impregnated substantially uniformly with a matrix material;
   f) causing said matrix material that has impregnated said compressed filamentary material to cure, thereby forming said grid structure having sinuous interstices; and g) removing said mandrels from said sinuous interstices after said matrix material has cured.

2. The method of claim 1 wherein the arranging of filamentary material according to a predetermined pattern to form generally planar intersecting grid sections comprises winding a filament made of a fibrous material on a loom according to said predetermined pattern.

3. The method of claim 1 wherein each of said cocoons comprises a sheet consisting of filamentary fibers; and wherein the inserting of said cocoons into corresponding interstices defined by said generally planar intersecting grid sections is accomplished by spreading said sheets of filamentary fibers within said corresponding interstices so that each sheet is in contact with surface portions of the generally planar intersecting grid sections that define the corresponding interstice.

4. The method of claim 1 wherein each of said expandable mandrels comprises:
 a) a plurality of die-plate components held together by spring means to form an elongate hollow structure, said die-plate components having undulate surface portions forming outer surfaces of said hollow structure; and
 b) an expander bolt extending longitudinally into said hollow structure;
and wherein the inserting of said expandable mandrels into corresponding cocoons in said interstices formed by said generally planar intersecting grid sections is performed while said mandrels are in a relaxed configuration in which said hollow structures have transverse dimensions that are smaller than corresponding transverse dimensions of said interstices.

5. The method of claim 4 wherein the expanding of each of said mandrels within said corresponding cocoons is accomplished by moving the expander bolt within said hollow structure of each of said mandrels so as to force said die-plate components laterally outward, the undulate surfaces of said die-plate components thereby causing the corresponding cocoon in the corresponding interstice to come into contact with said surface portions of the generally planar intersecting grid sections that define said corresponding interstice.

6. A grid structure comprising a plurality of grid sections that intersect each other to define interstices, said intersecting grid sections having undulate surfaces.

7. The grid structure of claim 6 wherein said intersecting grid sections interpenetrate each other in a manner that maintains substantially uniform weight distribution throughout said grid structure.

8. The grid structure of claim 6 wherein said grid sections are formed from a composite material consisting of fibers embedded in a matrix.

9. The grid structure of claim 8 wherein said fibers consist essentially of graphite fibers.

10. The grid structure of claim 9 wherein said matrix consists essentially of epoxy resin.

11. The grid structure of claim 6 wherein said intersecting grid sections intersect each other at angles that determine a specified configuration for said grid structure.

12. The grid structure of claim 11 wherein said intersecting grid sections intersect each other at right angles.

13. A grid structure having sinuous interstices defined by intersecting grid sections, said intersecting grid sections having specified undulate surfaces, said grid structure being fabricated by a process comprising:
 a) arranging filamentary material according to a predetermined pattern to form generally planar intersecting grid sections;
 b) inserting cocoons made of filamentary material into corresponding interstices defined by said generally planar intersecting grid sections, the filamentary material of said cocoons in said interstices extending transversely with respect to the filamentary material that is arranged to form said generally planar intersecting grid sections;
 c) inserting expandable mandrels into corresponding cocoons, said mandrels having undulate surfaces conforming generally to the undulate surfaces specified for the intersecting grid sections of the grid structure that is to be fabricated;
 d) expanding said mandrels within said corresponding cocoons so as to compress the filamentary material of said cocoons together with the filamentary material arranged to form said generally planar intersecting grid sections, said mandrels when expanded thereby converting said compressed filamentary material into intersecting grid sections with undulate surfaces, the undulate surfaces of said intersecting grid sections conforming generally to the undulate surfaces specified for the intersecting grid sections of the grid structure that is to be fabricated;
 e) causing said compressed filamentary material that has been converted into said intersecting grid sections with undulate surfaces to be impregnated substantially uniformly with a matrix material;
 f) causing said matrix material that has impregnated said compressed filamentary material to cure, thereby forming said grid structure having sinuous interstices; and
 g) removing said mandrels from said sinuous interstices after said matrix material has cured.

14. The grid structure of claim 13 wherein the arranging of filamentary material according to a predetermined pattern to form generally planar intersecting grid sections comprises winding a filament made of a fibrous material on a loom according to said predetermined pattern.

15. The grid structure of claim 13 wherein each of said cocoons comprises a sheet consisting of filamentary fibers; and wherein the inserting of said cocoons into corresponding interstices defined by said generally planar intersecting grid sections is accomplished by spreading said sheets of filamentary fibers within said corresponding interstices so that each sheet is in contact with surface portions of the generally planar intersecting grid sections that define the corresponding interstice.

16. The grid structure of claim 13 wherein each of said expandable mandrels comprises:
 a) a plurality of die-plate components held together by spring means to form an elongate hollow structure, said die-plate components having undulate surface portions forming outer surfaces of said hollow structure; and
 b) an expander bolt extending longitudinally into said elongate hollow structure;
and wherein the inserting of said expandable mandrels into corresponding cocoons in said interstices formed by said generally planar intersecting grid sections is performed while said mandrels are in a relaxed configuration in which said hollow structures have transverse dimensions that are smaller than corresponding transverse dimensions of said interstices.

17. The grid structure of claim 16 wherein the expanding of each of said mandrels within said corresponding cocoons is accomplished by moving the expander bolt within said hollow structure of each of said mandrels so as to force said die-plate components laterally outward, the undulate surfaces of said die-plate components thereby causing the corresponding cocoon in the corresponding interstice to come into contact with said surface portions of the generally planar intersecting grid sections that define said corresponding interstice.

18. An apparatus for fabricating a grid structure that has sinuous interstices defined by intersecting grid sections, said intersecting grid sections having undulate surfaces, said apparatus comprising:
   a) a loom comprising:
      (i) a base member; and
      (ii) a plurality of posts mounted on said base member, said posts being fixedly positioned with respect to each other so that filamentary material wound around said posts according to a predetermined pattern forms generally planar intersecting grid sections that define interstices into which hollow cocoons made of filamentary material can be inserted;
   b) a plurality of comb plates, each of said comb plates having tooth portions with gaps between adjacent tooth portions, said comb plates being dimensioned for placement with respect to said posts so that portions of the filamentary material wound around said posts extend through said gaps between adjacent tooth portions of said comb plates;
   c) a plurality of expandable mandrels insertable into the hollow cocoons in corresponding interstices defined by said generally planar intersecting grid sections, said mandrels when expanded causing the filamentary material wound around said posts and the filamentary material of said hollow cocoons to be compressed together so as to form intersecting grid sections having undulate surfaces;
   d) a top plate securable to said comb plates so as to bear against said mandrels, said top plate having a closable aperture through which a matrix material can be introduced to impregnate the compressed filamentary material forming the intersecting grid sections having undulate surfaces;
   e) means for applying force to said top plate so as to cause said mandrels to expand, thereby compressing the filamentary material wound around said posts and the filamentary material of said hollow cocoons so as to form the intersecting grid sections having undulate surfaces; and
   f) means for applying force to said comb plates so as to compress the filamentary material wound around said posts and the filamentary material of said hollow cocoons.

19. The apparatus of claim 18 wherein said base member is configured so as to define a central aperture; and wherein said posts are mounted on said base member adjacent said central aperture so that the generally planar intersecting grid sections formed from the filamentary material wound around said posts are formed within a volume over the central aperture of said base member.

20. The apparatus of claim 19 further comprising a floor plate, said floor plate being dimensioned so that a peripheral portion of said floor plate can be supported on a portion of said base member circumjacent the central aperture, said floor plate thereby forming a bottom for the volume over the central aperture of said base member; said comb plates being securable to said floor plate, said comb plates being positionable between said posts and the central aperture so that said comb plates form sides for the volume over the central aperture of said base member; said top plate forming a top for the volume over the central aperture of said base member; said top plate together with said comb plates and said floor plate forming a box enclosing the volume over the central aperture of said base member, said box containing the compressed filamentary material forming the intersecting grid sections having undulate surfaces.

21. The apparatus of claim 18 wherein each of said expandable mandrels comprises:
   (a) a plurality of die-plate components held together by spring means to form an elongate hollow structure, said die-plate components having undulate surface portions forming outer surfaces of said hollow structure; and
   (b) an expander bolt extending longitudinally into said hollow structure, said expander bolt being movable so as to cause said die-plate components to move laterally outward, thereby causing the outer surfaces of said hollow structure to press the corresponding cocoon in the corresponding interstice into contact with surface portions of the generally planar intersecting grid sections that define the corresponding interstice, said die-plate components thereby compressing the filamentary material wound around said posts and the filamentary material of said cocoons together so as to convert the filamentary material into the intersecting grid sections having undulate surfaces.

22. The apparatus of claim 18 wherein said means for applying force to said top plate comprises hydraulic means.

23. The apparatus of claim 18 wherein said means for applying force to said comb plates comprises:
   a) sliding members positioned on said base member;
   b) pressure pads secured to said sliding members so as to bear against said comb plates; and
   c) means for moving said sliding members along said base member so that said pressure pads exert forces on said comb plates.

24. The apparatus of claim 20 wherein the central aperture of said base member is of generally square configuration, and wherein said floor plate is likewise of square configuration dimensioned to be received within the central aperture of said base member.

25. The apparatus of claim 24 further comprising tubular columns secured to corner portions of said floor plate, said comb plates being s secured to said tubular columns to form sides for the volume over the central aperture of said base member.

26. The apparatus of claim 18 wherein said die-plate components forming each elongate hollow structure comprise four corner components and four wedge components, said four corner components being positioned with respect to each other to function as corners of said hollow structure, each of said wedge components being positioned between a corresponding pair of said corner components; and wherein said expander bolt is movable so as to cause said wedge components to move laterally outward until an undulate surface portion of each wedge component is flush with undulate surface portions of adjacent corner components.

27. The apparatus of claim 18 in combination with means for curing the matrix material impregnating the compressed filamentary material forming the intersecting grid sections with undulate surfaces, said intersecting grid sections with undulate surfaces thereby becoming said grid structure having sinuous interstices.

28. The apparatus of claim 20 in combination with means for removing said box containing the compressed filamentary material forming the intersecting grid sections having undulate surfaces from said loom.

29. The apparatus of claim 28 in combination with means for curing the matrix material impregnating the compressed filamentary material forming the intersecting grid sections with undulate surfaces within said box, said intersecting grid sections with undulate surfaces thereby becoming said grid structure having sinuous interstices.

30. A system for fabricating a grid structure having sinuous interstices defined by intersecting grid sections, said intersecting grid sections having undulate surfaces, said apparatus comprising:
  a) a loom comprising:
    (i) a base member defining a central aperture; and
    (ii) a plurality of posts fixedly positioned with respect to each other adjacent the central aperture of said base member so that filamentary material wound around said posts according to a predetermined pattern forms generally planar intersecting grid sections within a volume over the central aperture of said base member, said generally planar intersecting grid sections defining interstices in which hollow cocoons of generally cylindrical configuration made of filamentary material can be inserted;
  b) a floor plate dimensioned so that a peripheral portion of said floor plate can be supported on a portion of said base member circumjacent the central aperture of said base member, said floor plate thereby forming a bottom for the volume over the central aperture of said base member;
  c) a plurality of comb plates securable to said floor plate, each of said comb plates having tooth portions with gaps between adjacent tooth portions, said comb plates being dimensioned for placement between said posts and the central aperture of said base member so that said comb plates form sides for the volume over the central aperture of said base member, portions of said generally planar intersecting grid sections extending from the volume over the central aperture of said base member through said gaps between adjacent tooth portions of said comb plates so as to wind around said posts;
  d) a plurality of expandable mandrels insertable into the hollow cocoons in corresponding interstices defined by said generally planar intersecting grid sections within the volume over the central aperture of said base member, each mandrel comprising:
    (i) a plurality of die-plate components held together by spring means to form an elongate hollow structure, said die-plate components having undulate surface portions forming outer surfaces of said hollow structure of the mandrel; and
    (ii) an expander bolt extending longitudinally into said hollow structure of the mandrel, said expander bolt being movable so as to cause said die-plate components to move laterally outward, thereby causing the outer surfaces of said hollow structure of the mandrel to press the corresponding cocoon in the corresponding interstice into contact with surface portions of the generally planar intersecting grid sections that define the corresponding interstice, said die-plate components thereby compressing the filamentary material of said cocoons together with the filamentary material arranged to form said generally planar intersecting grid sections so as to convert the compressed filamentary material to intersecting grid sections with undulate surfaces;
  e) a top plate securable to said comb plates, said top plate forming a top for the volume over the central aperture of said base member, said top plate together with said comb plates and said floor plate forming a box enclosing the volume over the central aperture of said base member, said box containing the compressed filamentary material forming the intersecting grid sections with undulate surfaces, said top plate having a closable aperture through which a matrix material can be introduced into the volume over the central aperture of said base member so as to impregnate the compressed filamentary material forming the intersecting grid sections with undulate surfaces;
  f) means for applying force to said top plate so as to cause said top plate to move the expander bolts within said hollow structures of said mandrels, thereby causing said die-plate components of said mandrels to move laterally outward so as to compress the filamentary material of said cocoons together with the filamentary material arranged to form said generally planar intersecting grid sections;
  g) means for applying force to said comb plates so as to compress the filamentary material of said cocoons together with the filamentary material arranged to form said generally planar intersecting grid sections;
  h) means by which said box containing the compressed filamentary material forming the intersecting grid sections with undulate surfaces can be removed from said loom; and
  i) means for curing the matrix material impregnating the intersecting grid sections with undulate surfaces within said box, said intersecting grid sections with undulate surfaces thereby becoming said grid structure having sinuous interstices.

31. The apparatus of claim 30 wherein said posts are fixedly positioned with respect to each other adjacent the central aperture of said base member so that the filamentary material wound around said posts forms generally planar intersecting grid sections of generally square transverse cross-sectional configuration.

32. The apparatus of claim 30 wherein said posts are secured to a frame member positioned beneath said base member, said posts extending through post holes in said base member adjacent the central aperture of said base member.

33. The apparatus of claim 30 wherein said floor plate has a plurality of openings that are dimensioned and positioned with respect to each other to receive bottoms portions of corresponding mandrels inserted into the hollow cocoons in corresponding interstices defined by said generally planar intersecting grid sections within the volume over the central aperture of said base member.

34. The apparatus of claim 30 wherein said means for applying force to said comb plates comprises:
 a) sliding members positioned on said base member;
 b) pressure pads secured to said sliding members so as to bear against said comb plates; and
 c) means for sliding said sliding members along said base member so that said pressure pads exert forces on said comb plates.

35. The apparatus of claim 30 wherein the central aperture of said base member is of generally square configuration, and wherein said floor plate is likewise of square configuration dimensioned to be received within the central aperture of said base member.

36. The apparatus of claim 35 further comprising tubular columns secured to corner portions of said floor plate, said comb plates being secured to said tubular columns to form sides for the volume over the central aperture of said base member.

37. The apparatus of claim 30 wherein said die-plate components forming each elongate hollow structure comprise four corner components and four wedge components, said four corner components being positioned with respect to each other to function as corners of said hollow structure, each of said wedge components being positioned between a corresponding pair of said corner components; and wherein said expander bolt is movable so as to cause said wedge components to move laterally outward so that an undulate surface portion of each wedge component is flush with undulate surface portions of adjacent corner components.

38. A method of forming a pattern for use in fabricating die-plate components having undulate surfaces, said method comprising:
 a) placing a plurality of substantially identical wafers on a base member to form a stack of said wafers, a proximal end of a stem member of specified transverse cross section being secured to said base member, each of said wafers having a central aperture that is larger than the specified transverse cross section of said stem member, said wafers being positioned one on top of another on said base member so that said stem member passes through the central aperture of each of said wafers;
 b) transversely displacing said stacked wafers by different amounts with respect to said stem member so that surface portions of said stack assume undulate configurations corresponding to the undulate surfaces specified for the die-plate components to be fabricated; and
 c) securing a fastening means to a distal end of said stem member so as to secure said wafers rigidly with respect to each other in said stack so that said surface portions of said stack retain said undulate configurations corresponding to the undulate surfaces specified for the die-plate components to be fabricated.

39. A pattern for use in fabricating die-plate components having specified undulate surfaces, said pattern comprising:
 a) a base member;
 b) an elongate stem member of specified transverse cross section, a proximal end of said stem member being secured to said base member;
 c) a plurality of wafers that are substantially identical to each other, each of said wafers having a central aperture that is larger than the specified transverse cross section of said stem member, said wafers being positioned one on top of another on said base member so that said stem member passes through the central aperture of each of said wafers, said wafers thereby forming a stack, said wafers being transversely displaced by different amounts with respect to said stem member so that surface portions of said stack assume undulate configurations corresponding to the undulate surfaces specified for the die-plate components to be fabricated; and
 d) fastening means secured to a distal end of said stem member so as to secure said wafers rigidly with respect to each other in said stack so that said surface portions of said stack retain said undulate configurations corresponding to the undulate surfaces specified for the die-plate components to be fabricated.

40. A spreading tool for insertion into a cocoon positioned in an interstice defined by generally planar intersecting grid sections, said spreading tool being laterally expandable to press portions of said cocoon into contact with corresponding portions of said intersecting grid sections defining corner portions of said interstice, said spreading tool comprising:
 a) four corner components and four wedge components held together by spring means to form an elongate hollow structure, said four corner components being positioned with respect to each other to function as corners of said hollow structure, each of said wedge components being positioned between a corresponding pair of said corner components; and
 b) an expander bolt extending longitudinally into said hollow structure, said expander bolt being movable so as to cause said four corner components to move laterally outward, thereby pressing said portions of said cocoon into contact with said corresponding portions of said intersecting grid sections.

41. An assemblage of interlocking grid structures, each of said grid structures comprising a plurality of grid sections that intersect each other to define sinuous interstices, said intersecting grid sections having undulate surfaces.

42. The assemblage of interlocking grid structures of claim 41 wherein the intersecting grid sections of each grid structure interpenetrate each other in a manner that maintains substantially uniform weight distribution throughout the grid structure.

43. The assemblage of interlocking grid structures of claim 41 wherein the intersecting grid sections of each of said grid structures are formed from a composite material consisting of fibers embedded in a matrix.

44. The assemblage of interlocking grid structures of claim 43 wherein said fibers consist essentially of graphite fibers.

45. The assemblage of interlocking grid structures of claim 44 wherein said matrix consists essentially of epoxy resin.

46. The assemblage of interlocking grid structures of claim 41 wherein the intersecting grid sections of each of said grid structures intersect each other at angles that determine a specified configuration for said grid structure.

47. The assemblage of interlocking grid structures of claim 46 wherein said intersecting grid sections intersect each other at right angles.

48. The assemblage of interlocking grid structures of claim 41 further comprising buoyant material contained within at least some of said sinuous interstices, and a substantially water-tight covering over said grid structures, said assemblage thereby being usable as a pontoon bridge.

49. The assemblage of interlocking grid structures of claim 41 wherein said grid structures are arranged with respect to each other in a configuration appropriate for deployment in extraterrestrial space.

* * * * *